United States Patent

Sharp

[11] Patent Number: 6,141,071
[45] Date of Patent: Oct. 31, 2000

[54] SWITCHABLE ACHROMATIC POLARIZATION ROTATOR

[75] Inventor: Gary D. Sharp, Boulder, Colo.

[73] Assignee: ColorLink, Inc., Boulder, Colo.

[21] Appl. No.: 09/245,863

[22] Filed: Feb. 8, 1999

Related U.S. Application Data

[63] Continuation-in-part of application No. 08/549,963, Oct. 30, 1995, Pat. No. 5,870,159.

[51] Int. Cl.$^7$ .................................................. G02F 1/1335
[52] U.S. Cl. ........................... 349/121; 349/117; 349/196
[58] Field of Search ..................... 349/117, 119, 349/120, 121, 172, 196

[56] References Cited

U.S. PATENT DOCUMENTS

| | | | |
|---|---|---|---|
| 4,711,530 | 12/1987 | Nakanowatari et al. | 350/339 R |
| 4,770,500 | 9/1988 | Kalmanash et al. | 350/347 E |
| 4,884,876 | 12/1989 | Lipton et al. | 350/347 E |
| 5,033,825 | 7/1991 | Ishikawa et al. | 350/339 R |
| 5,089,905 | 2/1992 | Sasaki et al. | 359/64 |
| 5,132,826 | 7/1992 | Johnson et al. | 359/93 |
| 5,187,603 | 2/1993 | Bos | 359/73 |
| 5,231,521 | 7/1993 | Johnson et al. | 359/93 |
| 5,237,438 | 8/1993 | Miyashita et al. | 359/73 |
| 5,243,455 | 9/1993 | Johnson et al. | 359/93 |
| 5,247,378 | 9/1993 | Miller | 359/86 |
| 5,257,123 | 10/1993 | Shingaki et al. | 359/86 |
| 5,347,378 | 9/1994 | Handschy et al. | 359/53 |
| 5,469,279 | 11/1995 | Sharp et al. | 349/171 |
| 5,528,393 | 6/1996 | Sharp et al. | 359/53 |
| 5,565,933 | 10/1996 | Reinsch | 348/742 |
| 5,619,355 | 4/1997 | Sharp et al. . | |
| 5,658,490 | 8/1997 | Sharp et al. . | |
| 5,751,384 | 5/1998 | Sharp . | |

FOREIGN PATENT DOCUMENTS

| | | |
|---|---|---|
| 56-137307A | 10/1981 | Japan . |
| 63-18987A | 7/1988 | Japan . |
| 03028823A | 2/1991 | Japan . |
| 04207774A | 7/1992 | Japan . |
| 7-84218 | 3/1995 | Japan . |
| WO90/09614 | 8/1990 | WIPO . |

OTHER PUBLICATIONS

Pancharatnam, S., "Achromatic Combinations of Birefringent Plates," Indian Academy Sci. Proceed. (1955), A41:130–136, A41:308–315.

Koester, C.J., "Achromatic Combinations of Half–Wave Plates," J. Optical Soc. Of America (Apr. 1959) 49:405–409.

Title, A.M., "Improvement of Birefringent Filters. 2:Achromatic Waveplates," Applied Optics (Jan. 1975) 14(1):229–237.

Wu, S.–T., "Birefringence dispersions of liquid crystals," Physical Review A, American Physical Society (1986) 33(2):1270–1274.

McIntyre, C.M. and Harris, S.E., "Achromatic Wave Plates for the Visible Spectrum," J.Opt. Soc. Of America (Dec. 1968) 58(12):1575–1580.

Displaytech, Inc. (Dec. 1995), "Achromatic Rotator", Boulder, CO, 2 pages.

Harlharan, P. and Ciddor, P.E. (1997), "Achromatic Switchable Polarization Rotators," Opt. Eng. 36(3):952–956.

Sharp, Gary Dean, "Chiral smectic liquid crystal tunable optical filters and modulators", 1992.

Primary Examiner—James A. Dudek
Attorney, Agent, or Firm—Fleshner & Kim, LLP

[57] ABSTRACT

This invention provides a liquid crystal achromatic rotator switch, and an achromatic shutter using the rotator switch. The rotator switch requires input light of a fixed orientation and switches between rotating the polarization by zero degrees and by a fixed angle, β. The achromatic shutter uses an achromatic 90-degree rotator switch positioned between a pair of polarizers. A first embodiment of the rotator switch comprises one rotatable liquid crystal half-wave retarder in series with one passive half-wave retarder. The liquid crystal retarder has fixed retardance and is driven between two orientations for off- and on-states. A second embodiment of the rotator switch utilizes two variable birefringence liquid crystal cells. The variable birefringence cells having fixed orientation and variable retardance. In the off-state both retarders have zero retardance and in the on-state they have half-wave retardance.

63 Claims, 24 Drawing Sheets

SWITCHABLE ACHROMATIC POLARIZATION ROTATOR

CROSS-REFERENCE TO RELATED APPLICATIONS

This application is a Continuation-In-Part of U.S. patent application Ser. No. 08/549,963 filed Oct. 30, 1995, U.S. Pat. No. 5,870,159 which is herein incorporated by reference in its entirety.

BACKGROUND OF THE INVENTION

1. Field of the Invention

The present invention relates to achromatic polarization rotator switches comprising two retarders in series, and to shutters and filters utilizing the rotator switch.

2. Background of the Related Art

Liquid crystal (LC) devices are presently utilized to produce numerous active structures, including color shutters, tunable polarization interference filters, light valves, and complex amplitude modulators. However, the chromaticity of liquid crystal retarders places limitations on the spectral band over which they function properly. Two factors contribute to the wavelength sensitivity, or chromaticity, of a waveplate: (1) dispersion, which is the wavelength dependence of the dielectric anisotropy, and (2) the explicit inverse wavelength dependence of retardation. Both components serve to increase the retardation at shorter wavelengths. A birefringent material with a particular retardation at the design wavelength will have greater retardation at shorter wavelengths and less retardation at longer wavelengths.

To examine the effect of retarder chromaticity, consider the polarization switches known in the art using rotative liquid crystal elements. In the conventional approach to shuttering light with a planar aligned chiral smectic liquid crystal (CSLC), the molecular director of an LC half-wave plate switches between 0 and $\pi/4$ orientations with respect to bounding crossed polarizers, as shown in FIG. 1. The half-wave retardance center wavelength is selected to provide maximum transmission at the operating wavelength. In displays and cameras, it is selected to optimally span the visible spectrum. However, the on-state bandwidth is narrow, and invariably has poor red/blue transmission. Furthermore, small spatial thickness variations of the CSLC film produce highly visible color variations. FIG. 2 shows the computer model on-state transmission of a prior art CSLC shutter utilizing a 500 nm half-wave plate. The model includes the effect of birefringence dispersion. Note the extreme chromaticity of the shutter; the transmission varies by a factor of two over the visible spectrum.

More elaborate active achromatic structures are described incorporating multiple active elements. Dahl et al. (PCT Publication No. WO 90/09614 [1990]) describe an LC shutter which incorporates chromatic compensation. Here, two analog CSLC half-wave plates are positioned between a pair of crossed polarizers. The two plates are symmetrically modulated, the first with orientation $\theta$ and the second with orientation 90-$\theta$, to provide a more achromatic response than a single cell shutter. Because this device requires two active CSLC cells, it has not achieved wide use.

Chromaticity compensation using passive multilayers of identical retarder material was addressed by S. Pancharatnam, Proc. Indian Acad. Sci. A41, 137 [1955], by A. M. Title, Appl. Opt. 14, 229 [1975], and by C. J. Koester, J. Opt. Soc. Am. 49, 405, [1959], all of which are herein incorporated by reference in their entirety.

Three-waveplate structures are described by Pancharatnam which function as achromatic retarders. These structures consist of three films of identical material, and design parameters are provided to allow construction of devices with arbitrary retardance values. It is noteworthy that a minimum of three elements are required in order to construct a Pancharatnam compound retarder.

By mechanically rotating a Pancharatnam achromatic half-wave retarder unit, wavelength insensitive reorientation of linear polarization is feasible. Electromechanical rotation of such compound half-wave retarders has been used extensively to tune polarization interference filters for astronomical imaging spectrometers. Of course, a solid-state version of this would require electro-optic rotation of three retarders synchronously.

A simplified solid-state achromatic retarder was recently invented by Sharp and Johnson, and is described in U.S. Pat. No. 5,658,490 which is herein incorporated by reference in its entirety. This Pancharatnam-based design comprises a single rotative LC half-wave retarder bounded by passive half-wave retarders. The inventors realized that, for a few specific orientations, rotation of a single element is sufficient to effectively rotate the optic axis of the entire structure.

Half-wave retarders, including the Pancharatnam three-element half-wave retarder unit, convert an incident plane polarized beam of arbitrary orientation $\theta$ with respect to the retarder axis to a beam of orientation -$\theta$. Koester realized that an "achromatic rotator" can be formed using two linear half-wave retarders. The achromatic rotator requires input polarization at a fixed orientation and provides rotation of the plane of polarization through a fixed angle. Unlike an achromatic retarder, it cannot accept light polarized with arbitrary orientation. Therefore, mechanical or solid state rotation of the waveplates would destroy the function of the achromatic rotator, and active switching of the rotator has not been described.

The above references are incorporated by reference herein where appropriate for appropriate teachings of additional or alternative details, features and/or technical background.

SUMMARY OF THE INVENTION

This invention provides an achromatic polarization rotator switch, and an achromatic shutter using the achromatic rotator switch. The achromatic rotator switch requires input light of a fixed orientation and switches between rotating the polarization of the input light by zero degrees and by a fixed angle, $\beta$. The achromatic shutter uses an achromatic 90-degree rotator switch positioned between a pair of polarizers. An achromatic shutter according to this invention is designed and demonstrated which provides excellent on-state transmission over the entire visible, $\geq 97\%$ from 415 nm to 700 nm after normalization for polarizer loss, and high contrast, 500:1 from 455 nm to 632 nm. This device was constructed using a commercially available LC mixture and low-cost stretched polymer retarder film.

One embodiment of the achromatic rotator switch comprises one planar-aligned rotatable smectic liquid crystal half-wave retarder in series with one passive half-wave retarder. The smectic liquid crystal cell has fixed retardance and is driven between two orientations for off- and on-states. To achieve a zero-rotation off-state, the achromatic rotator switch exploits the fact that, in general, the state of polarization is unchanged by a pair of identical retardation films with crossed optic axes. Thus, for the off-state, the active and passive retarders are crossed. For the on-state, design equations are provided that determine the tilt angle requirements and orientations for optimum spectral coverage. Equations governing shutter contrast ratio are also provided that dictate the extent to which the zero-order retarders must be matched in characteristics. The smectic liquid crystal cells can utilize SmC* and SmA* liquid crystals, as well as distorted helix ferroelectric (DHF), antiferroelectric, and achiral CSLCs.

Another embodiment of the achromatic rotator switch utilizes two variable birefringence liquid crystal cells. The variable birefringence cells have fixed orientations and variable retardance. In the off-state both retarders have zero retardance, and in the on-state they have a half-wave retardance. The orientations of the two retarders are fixed, and follow the same design equations as the on-state orientations of the embodiment that utilizes a planar-aligned smectic liquid crystal half-wave retarder. The variable birefringence liquid crystal cells used in the present invention are suitably homogeneously aligned nematic liquid crystals, nematic π-cells, and homeotropically aligned smectic liquid crystal cells.

An achromatic rotator switch that is spatially switched is also provided. One embodiment of the spatially switched achromatic rotator switch comprises a spatially switched passive retarder, in which the orientation of the optic axis varies as a function of position on the spatially switched passive retarder, in series with one passive half-wave retarder. The spatially switched passive retarder has a fixed retardance, and has at least two optic axis orientation states. One of the optic axis orientation states is crossed with respect to the optic axis orientation state of the passive half-wave retarder, thus resulting in an off-state. The other optic axis orientation state results in an achromatic rotator (on-state) when combined with the passive retarder.

Another embodiment of the spatially switched achromatic rotator switch comprises variable birefringence cell in series with a spatially switched retarder that has a fixed optic axis orientation, and a retardance that varies between at least zero and a half-wave as a function of position on the spatially switched retarder 400.

The achromatic polarization rotator switch is useful for achromatizing the on-state of shutters, creating a neutral off-state with parallel polarizers; modulating the polarization in color shutters, inverting the spectra of polarization interference filters, compensating for color variations in CSLC shutters, and for generally increasing the throughput of polarization control systems.

The present invention may be achieved in whole or in part by an active achromatic polarization rotator, comprising an actively controlled retarder having an optic axis orientation that is switchable between a first orientation state, in which the active rotator provides substantially achromatic rotation of input light that is at least partially polarized with a predetermined polarization, and a second orientation state.

The present invention may also be achieved in whole or in part by an achromatic rotator for receiving input light that is at least partially polarized with a predetermined polarization, comprising: (1) a first retarder having a predetermined optic axis orientation with respect to the polarization of the input light; and (2) an active retarder having an optic axis orientation that is switchable between a first orientation state and a second orientation state, wherein the polarization of the input light is achromatically rotated by a predetermined angle when the optic axis orientation of the active retarder is in the first orientation state, and is substantially unchanged when the optic axis orientation of the active retarder is in the second orientation state.

The present invention may also be achieved in whole or in part by an achromatic polarization rotator for receiving input light that is at least partially polarized with a predetermined polarization and selectively rotating the polarization of the input light by a predetermined angle, comprising: (1) a first having a predetermined optic axis orientation with respect to the polarization of the input light; and (2) an active retarder in series with the first retarder, wherein the active retarder comprises has an optic axis orientation that is switchable between a first orientation state and a second orientation state, and wherein, when the input light propagates through both the first retarder and the active retarder in series, the polarization of the input light is substantially achromatically rotated by the predetermined angle when the optic axis orientation of the active retarder is in the first orientation state, and is substantially unchanged when the optic axis orientation of the active retarder is in the second orientation state.

The present invention may also be achieved in whole or in part by an achromatic polarization rotator for receiving input light that is at least partially polarized with a predetermined polarization and selectively rotating the polarization of the input light by a predetermined angle, comprising: (1) a first retarder having a predetermined optic axis orientation with respect to the polarization of the input light; and (2) a spatially switched retarder in series with the first retarder, wherein the spatially switched retarder comprises at least a first portion with a first optic axis orientation state, and a second portion with a second optic axis orientation state, and wherein, when the input light propagates through both the first retarder and the active retarder in series, the polarization of the input light is substantially achromatically rotated by the predetermined angle when the input light propagates through the first portion of the spatially switched retarder, and is substantially unchanged when the input light propagates through the second portion of the spatially switched retarder.

The present invention may also be achieved in whole or in part by an achromatic polarization rotator for receiving input light that is at least partially polarized with a predetermined polarization and selectively rotating the polarization of the input light by a predetermined angle, comprising: (1) an active retarder having a first optic axis orientation with respect to the polarization of the input light, and exhibiting a retardance at a design wavelength that is switchable between a first retardance value and a second retardance value; and (2) a spatially switched retarder, in series with the active retarder, having a second optic axis orientation, wherein the spatially switched retarder comprises at least a first portion that exhibits the first retardation value at the design wavelength, and a second portion that exhibits the second retardation value at the design wavelength, and wherein, when the input light propagates through both the active and the spatially switched retarders in series, the polarization of the input light is substantially unchanged when the active retarder exhibits the first retardation value and the input light propagates through the first portion of the spatially switched retarder, and is substantially achromatically rotated by the predetermined angle when the active retarder exhibits the second retardation value and the input light propagates through the second portion of the spatially switched retarder.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The elements in the devices of this invention are optically coupled. The orientation of a polarizer refers to the orientation of the transmitting axis, and the orientation of a birefringent element refers to the orientation of the principal optic axis of that element. Orientations are defined with respect to the axis of polarization of the polarized component of input light.

The present invention is designed to work with at least "partially polarized light". The term "partially polarized light" refers to light in any frequency spectrum of electromagnetic radiation and can be partially elliptically polarized light with any ellipticity, orientation or handedness. Partially polarized light consists of a polarized component and an unpolarized component. The unpolarized component is passed substantially unchanged by the passive and active retarders of the present invention, which will be discussed in more detail below. The polarized component can have any polarization, including any orientation ellipticity and handedness. See, for example, Chapter 1 of "Optical Waves in Layered Media", Copyright 1988, John Wiley & Sons, New York, which is incorporated by reference in its entirety herein.

In the illustrations of birefringent elements, the orientation is shown by arrow-headed lines and the retardance is labeled on the side of the element. When the retardance is switchable between two values, the values are both labeled on the side of the element and are separated by a comma. The retardance refers to the retardance at a design wavelength, where the term "design wavelength" refers to the wavelength at which the retarders provide the specified retardance. At other wavelengths, there is a deviation in retardance ($\delta$) from the retardance at the design wavelength.

The term "fixed retarder" refers to a birefringent element with an orientation and a retardance that are not electronically modulated. Rotatable liquid crystal retarders of this invention have electronically rotatable orientations and fixed retardances at the design wavelength. Variable retarders or, equivalently, liquid crystal variable birefringence retarders, have electronically variable retardances (birefringence) and fixed orientations. The term "achromatic" refers to an optical device having substantially no first-order dependence of the transmitted electromagnetic field amplitude on $\delta$, and therefore no second-order dependence of the transmitted power on $\delta$.

The term "spatially switched retarder" refers to a passive retarder in which the orientation and/or the retardance varies as a function of position on the retarder.

90-Degree Rotator

Figure 3A:
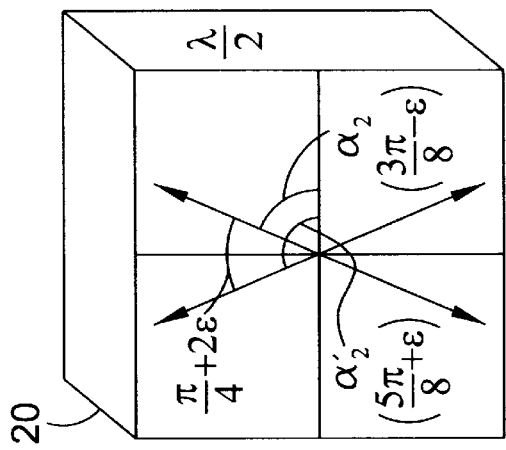
FIG. 3a illustrates an achromatic rotator switch comprising a rotatable smectic liquid crystal half-wave plate following a single passive retarder, in accordance with the present invention.
Figure 3A:
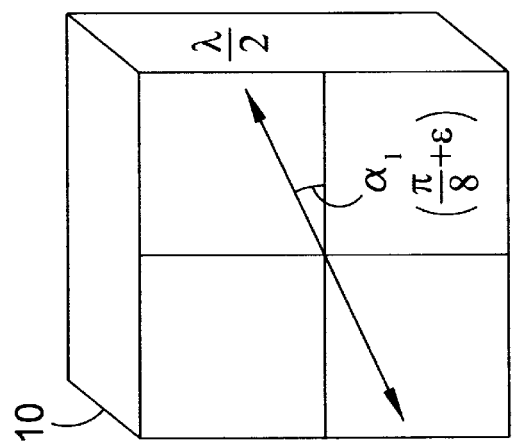
Figure 3A:
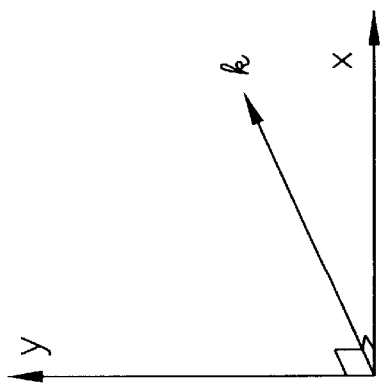
Figure 4:
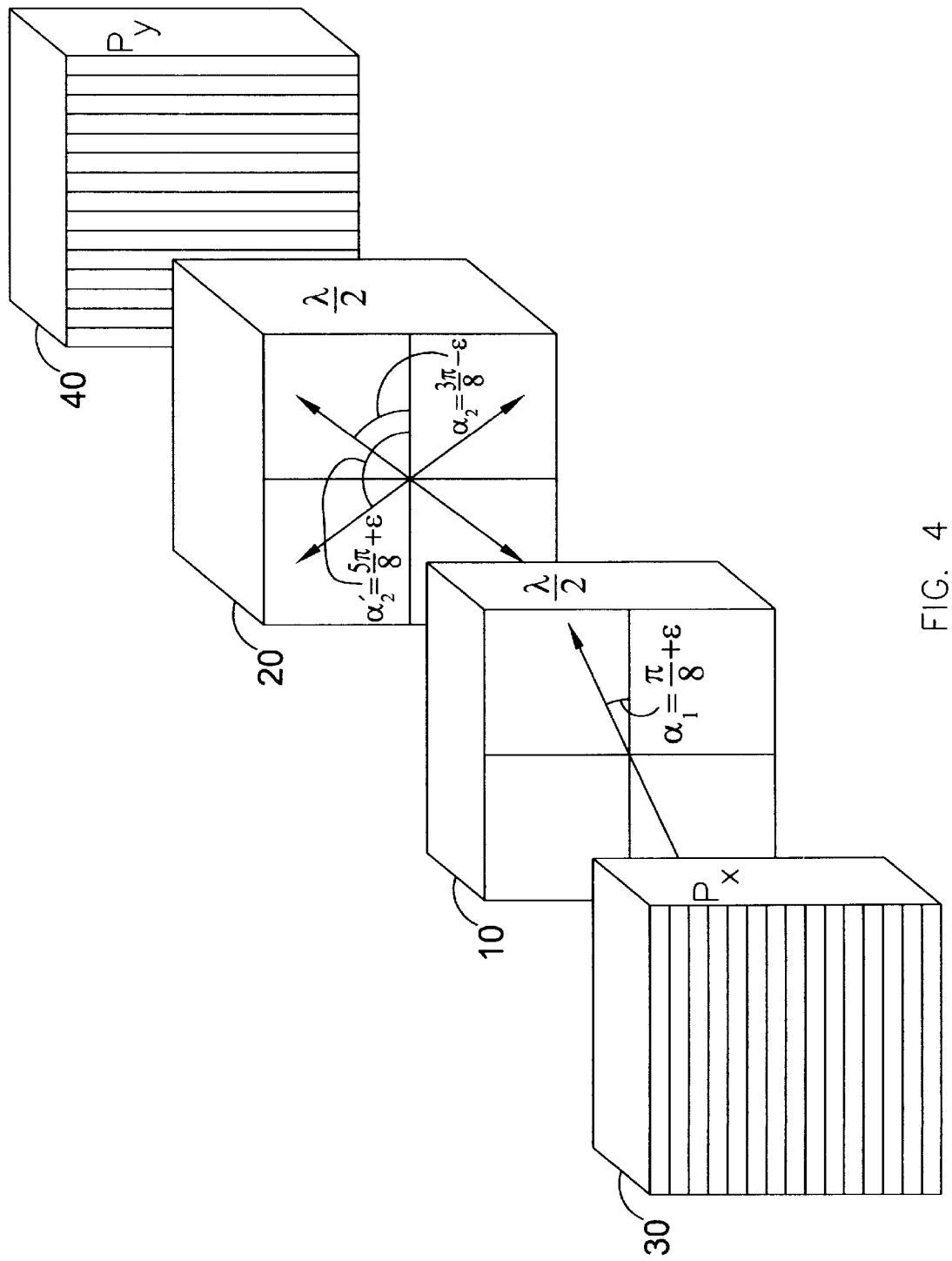
FIG. 4 is an achromatic shutter utilizing a 90-degree achromatic rotator switch, in accordance with the present invention.

FIG. 3a shows a first embodiment of the polarization rotator switch of this invention. Since it is commonly desirable to switch broadband light between orthogonal linear states, the embodiment shown in FIG. 3a exhibits a 90-degree achromatic rotation. An achromatic shutter, shown in FIG. 4, is formed by placing the rotator switch between a pair of polarizers.

The polarization rotator switch generally comprises a passive retarder 10 with a predetermined optic axis orientation with respect to the polarization of the input light, and an active retarder 20 with an optic axis orientation that is switchable between a first orientation state and a second orientation state. The active retarder 20 is preferably a rotatable liquid crystal retarder.

The passive and active retarders 10 and 20 both preferably exhibit the same predetermined retardance at a design wavelength. In the embodiment of FIG. 3a, the passive and active retarders 10 and 20 each preferably exhibit a retardance of a half-wave ($\lambda/2$) at the design wavelength.

The passive retarder 10 is oriented generally at $\alpha_1$ with respect to input light (not shown) that is, at least partially polarized along the x-axis. The rotatable liquid crystal retarder 20 is oriented generally at $\alpha_2$ in an on-state and at $\alpha_2'$ in an off-state. In the embodiment of FIG. 3a, $\alpha_1$ is $(\pi/8)+\epsilon$, $\alpha_2$ is $(3\pi/8)-\epsilon$ and $\alpha_2'$ is $(5\pi/8)+\epsilon$, where $\epsilon$ is a small angle.

In the on-state, the rotator switch of FIG. 3a provides an achromatic 90-degree polarization rotation, optimally exhibiting an exact 90-degree rotation at two wavelengths, $\lambda_R$ and $\lambda_B$. The off-state corresponds to crossed optic axes and produces a substantially zero net retardation and substantially no polarization rotation.

The small angle $\epsilon$ is selected to optimize the performance of the rotator switch over the wavelength band of operation. Increasing e increases the separation between $\lambda_R$ and $\lambda_B$. The maximum preferred $\epsilon$ is that for which $\lambda_B\lambda_R$ equals the desired operating band. Accordingly, the term "small angle" is used herein to refer to any value of $\epsilon$ that is less than the maximum preferred $\epsilon$. The "small angle" is typically less than 15°, and preferably less than 5°. For a non-zero value of $\epsilon$, a substantially exact 90-degree rotation occurs for two wavelengths. As the angle $\epsilon$ is increased, the operating band is increased. However, the sacrifice is a loss in rotation efficiency at the design wavelength of the half-wave retarders. The half-wave design wavelength is selected based on the desired operating band. Due to the inverse wavelength dependence of retardation and the birefringence dispersion, the half-wave design wavelength is less than the center of the operating band.

In the embodiment of FIG. 3a, the optic axis of the active retarder 20 must rotate by an angle of $(\pi/4)+2\epsilon$. Thus, the optimum tilt angle for the rotator is slightly greater than the $\pi/8$ tilt angle required for the exemplary prior art shutter discussed above. Since the achromatic bandwidth is sensitive to $\epsilon$, the CSLC tilt angle is a critical parameter for optimization. Since the tilt angle depends upon temperature, applied field and modulation rate, active compensation for operating conditions can be used to stabilize the liquid crystal rotatable retarder 20. Inaccuracy in the orientations of the active retarder 20 and the passive retarder 10 must be less than $\epsilon$, and is preferably less than 0.5°.

Figure 3B:
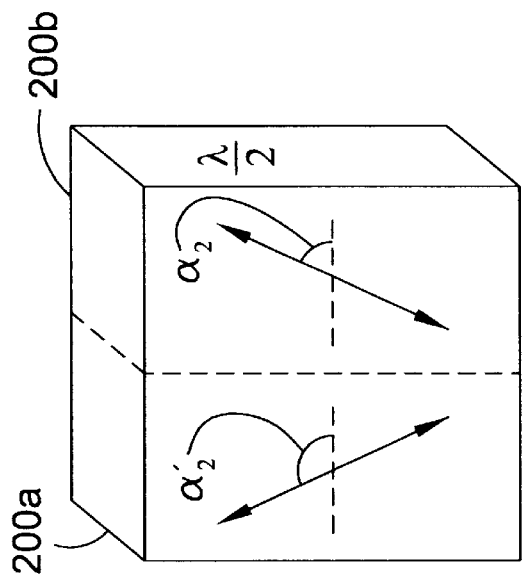
FIG. 3b illustrates an achromatic rotator switch comprising a spatially switched retarder following a single passive retarder, in accordance with the present invention.
Figure 3B:
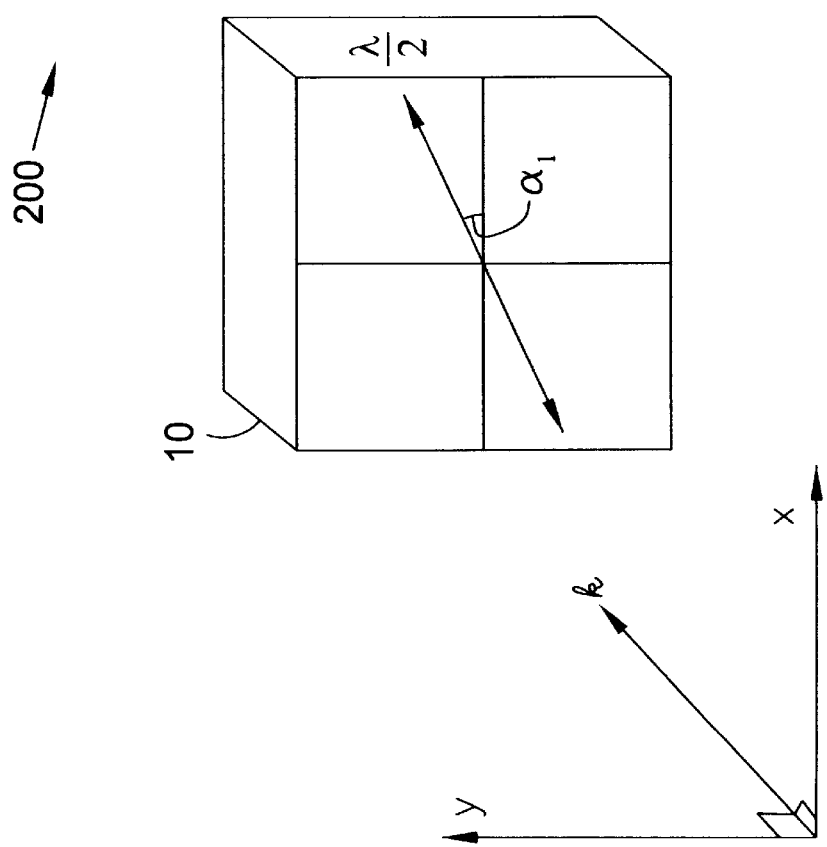

In a second embodiment of the achromatic rotator switch, shown in FIG. 3b, the active retarder 20 is replaced by a spatially switched retarder 200 with an optic axis orientation that varies as a function of position on the spatially switched retarder 200. The spatially switched retarder 200 is preferably a planar-aligned passive retarder having at least a first portion 200a with a first optic axis orientation, and a second portion 200b with a second optic axis orientation.

In the embodiment shown in FIG. 3b, the spatially switched retarder 200 has a fixed optic axis orientation $\alpha_2$ in the first portion 200a of the retarder 200, and a fixed optic axis orientation $\alpha_2'$ in the second portion 200b of the spatially switched retarder 200. The retardance of the spatially switched retarder 200 at the design wavelength is preferably fixed and substantially the same in both the first and second retarder portions 200a and 200b.

Similar to the embodiment shown in FIG. 3a, the orientations $\alpha_2$ and $\alpha_2'$ are termed the on-state and the off-state, respectively. The spatially switched retarder 200 preferably provides a half-wave ($\lambda/2$) retardance at the design wavelength in both the first portion 200a and the second portion 200b. The retardance of the passive retarder 10 is also preferably a half-wave ($\lambda/2$) at the design wavelength. Although the spatially switched retarder 200 shown in FIG. 3b is divided into two portions 200a and 200b, with respective optic axis orientations $\alpha_2$ and $\alpha_2'$, the spatially switched retarder 200 can be divided into additional portions that exhibit other optic axis orientations.

The active retarder 20 is suitably an FLC, or any material with an electronically rotatable optic axis, including planar aligned SmC* and SmA* liquid crystals, as well as distorted helix ferroelectric (DHF), antiferroelectric, achiral CSLCs, and in-plane switched nematics. The active retarder 20 switches between at least two orientations, $\alpha_2$ and $\alpha_2'$. It can, depending on the liquid crystal employed and the electric field applied, rotate continuously between a range of orientations, including $\alpha_2$ and $\alpha_2'$, switch between bistable states $\alpha_2$ and $\alpha_2'$, or be switched between two or more discrete but not necessarily stable orientations. Although orientations between $\alpha_2$ and $\alpha_2'$ do not produce achromatic rotators, they can be used for gray scale transmission if used in a shutter. Liquid crystals having surface or volume stabilized orientations can be used to make passive matrix displays having memory.

The active retarder 20, or the spatially switched retarder 200, and the passive retarder 10 are preferably matched in design wavelength and dispersion. In the shutter having crossed polarizers, an ideal broadband off-state occurs when the active and passive retarders have half-wave retardation wavelengths that are substantially identical, have dispersions that are substantially matched, and have fully crossed orientations. In practice, off-state leakage is often due to residual retardance between the retarders. While center wavelengths can be easily matched, residual retardance is typically attributed to different birefringence dispersion for the two retarder materials. For instance, typical retardation films used for display devices (Nitto NRF or NRZ) exhibit lower birefringence dispersion than typical CSLC mixtures (E-Merck ZLI-3654 or SCE-13). This difference yields a small leakage at the extreme blue/red wavelengths of the shutter operating band.

Figure 3C:
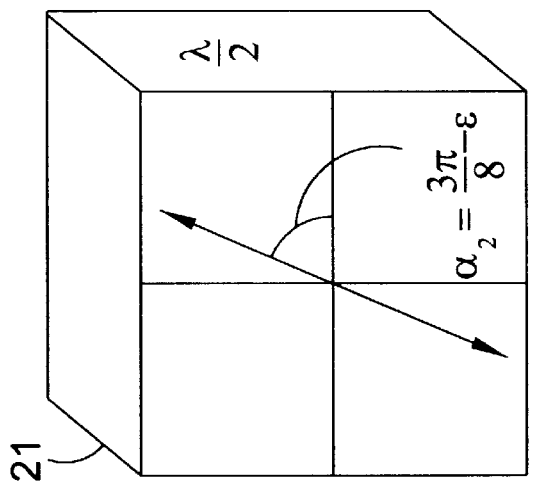
FIG. 3c illustrates an achromatic rotator switch comprising a rotatable smectic liquid crystal half-wave plate preceding a single passive retarder, in accordance with the present invention.
Figure 3C:
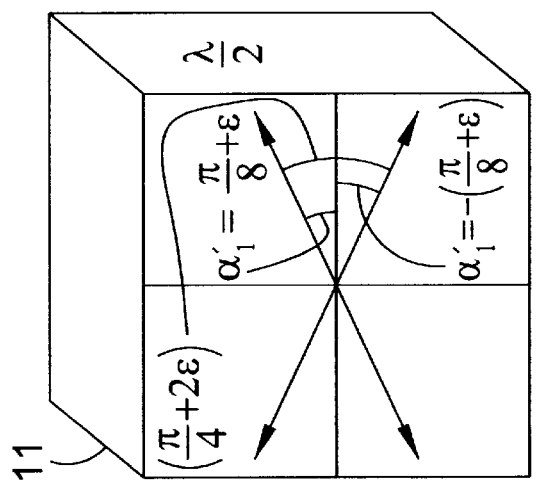
Figure 3C:
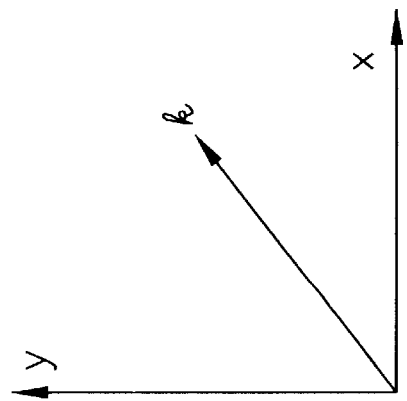

In the rotator switch embodiment of FIG. 3a, the first retarder 10 is passive and the second retarder 20 is active. FIG. 3c shows a rotator switch embodiment in which the second retarder 21 is passive and the first retarder 11 is active. The orientation of passive retarder 21 is fixed at $\alpha_2=(3\pi/8)-\epsilon$, and the orientation of active retarder 11 switches between $\alpha_1=(\pi/8)+\epsilon$ in the on-state and $\epsilon_1'=-[(\pi/8)+\epsilon]$ in the off-state. As in the rotator embodiment of FIG. 3a, the rotation required between the on-state and the off-state is $(\pi/4)+2\epsilon$, and the two retarders 11 and 21 are crossed in the off-state.

Figure 3D:
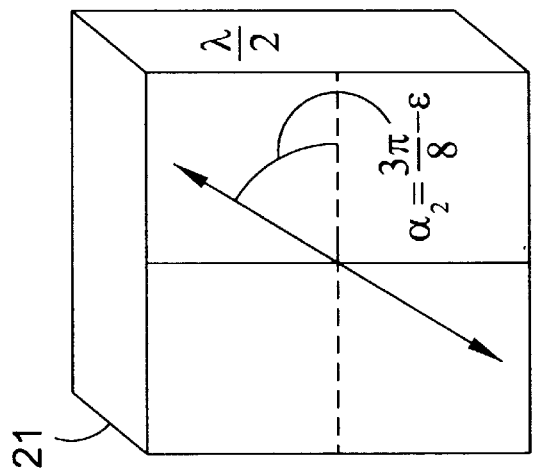
FIG. 3d illustrates an achromatic rotator switch comprising a spatially switched retarder preceding a single passive retarder, in accordance with the present invention.
Figure 3D:
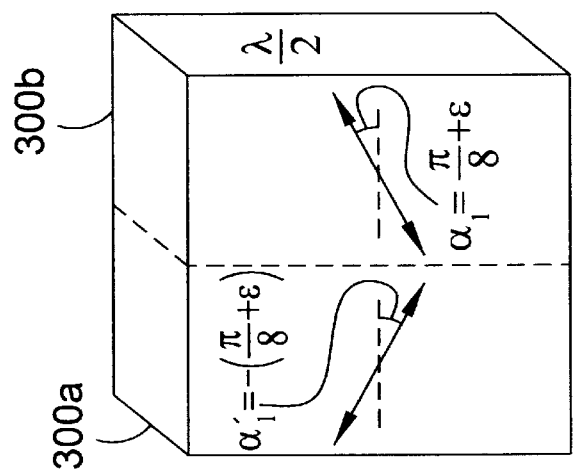
Figure 3D:
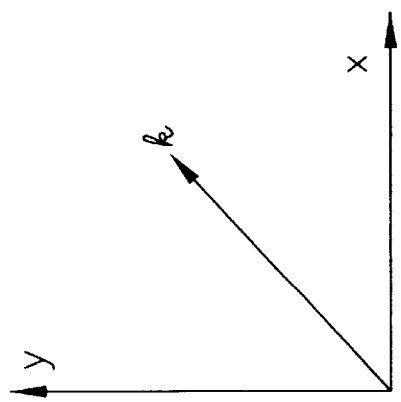

FIG. 3d shows a rotator switch embodiment that is similar to the rotator switch embodiment of FIG. 3c, except that active retarder 11 is replaced by spatially switched retarder 300. The spatially switched retarder 300 is similar to the spatially switched retarder 200 described above in connection with FIG. 3b. The spatially switched retarder 300 has a fixed optic axis orientation $\alpha_1'=-[(\pi/8)+\epsilon)]$ in one portion 300a, and an optic axis orientation $\alpha_1=\pi/8+\epsilon$ in a second portion 300b. In the embodiment of FIG. 3d, the spatially switched retarder 300 preferably provides a half-wave retardance at the design wavelength in both the first portion 300a and second portion 300b.

Figure 3E:
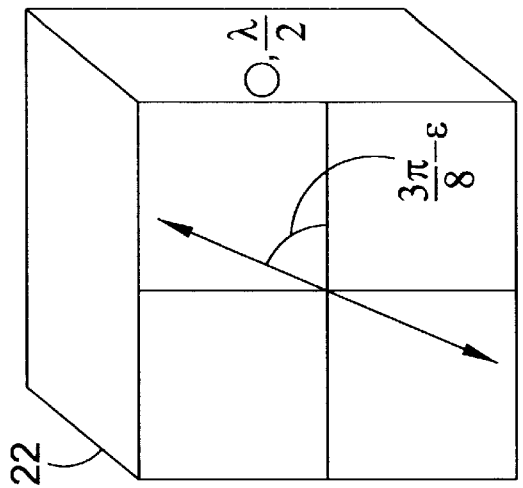
FIG. 3e illustrates an achromatic rotator switch comprising two variable birefringence retarders, in accordance with the present invention.
Figure 3E:
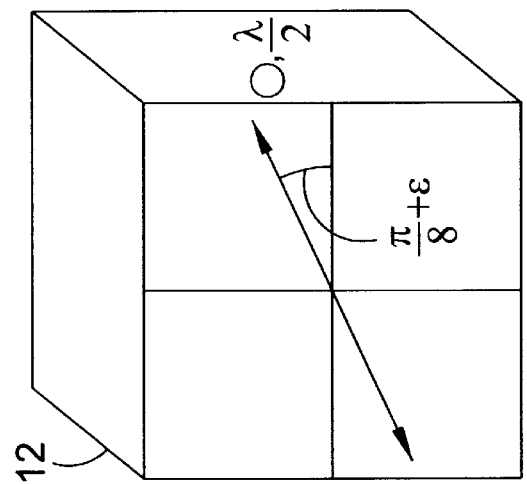
Figure 3E:
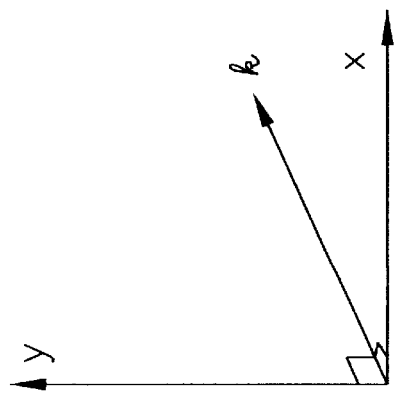

Another embodiment of the 90-degree polarization rotator switch is shown in FIG. 3e. It comprises two variable birefringence retarders 12 and 22 having retardance simultaneously switchable between zero and a predetermined retardation value, preferably a half-wave in order to provide a 90-degree rotation. Retarder 12 is oriented at $(\pi/8)+\epsilon$ and retarder 22 is oriented at $(3\pi/8)-\epsilon$. The isotropic state (zero-rotation) is generated by electrooptically adjusting the retardance of both retarders 12 and 22 to zero. In the embodiment shown in FIG. 3e, achromatic 90-degree rotation is provided when the retardance of each element is a half-wave. The variable birefringence liquid crystal cells which can be used in this invention include vertically aligned nematics, hybrid aligned nematics homogeneously aligned nematic liquid crystals, nematic $\pi$-cells, and homeotropically aligned smectic liquid crystal cells.

Figure 3F:
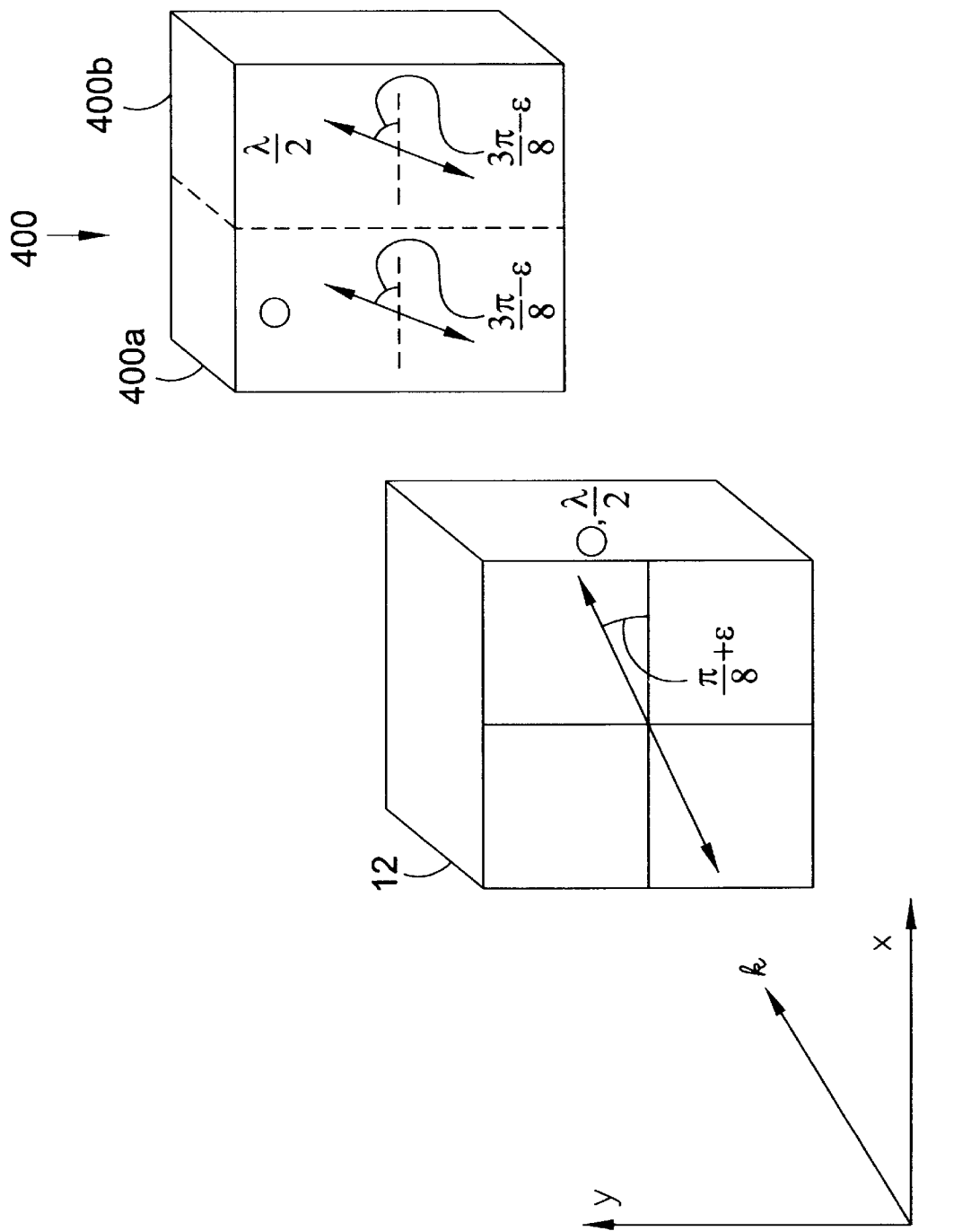
FIG. 3f illustrates an achromatic rotator switch comprising a spatially switched retarder in series with a variable birefringence retarder, in accordance with the present invention.

FIG. 3f shows a rotator switch embodiment similar to the embodiment of FIG. 3e, except that the variable birefringence retarder 22 is replaced by spatially switched retarder 400 with a fixed optic axis orientation, and a retardance that varies between at least zero and a predetermined value as a function of position on the spatially switched retarder 400.

In the embodiment of FIG. 3f, the spatially switched retarder 400 has at least a first portion 400a that provides substantially zero retardance at the design wavelength, and a second portion 400b that provides a substantially half-wave retardance at the design wavelength. The spatially switched retarder 400 has the same optic axis orientation in all portions 400a and 400b. The optic axis orientation in both portions 400a and 400b is $(3\pi/8)-\epsilon$ in the embodiment of FIG. 3f.

Two methods of forming a spatially switched retarder 400 with a retardance that varies as a function of position on the spatially switched retarder are (1) patterning the pretilt of liquid crystal polymers and (2) physically pattern the retardation. In the first method, the retardation of the film is fixed, but the in-plane projection is controlled spatially. With LCPs, pre-tilt can be controlled with UV polarization, thereby determining in-plane retardation.

In the second method, the local retardation is controlled, either by varying the film thickness, or by varying its birefringence. There are a number of ways to control thickness, including etching material from a blanket retardation film, or by selectively aligning material. Birefringence can be controlled by locally stressing an isotropic substrate.

Although the second variable birefringence retarder 22 (shown in FIG. 3e) is replaced by the spatially switched retarder 400 in the embodiment of FIG. 3f, the first variable birefringence retarder 12 could also be replaced by a spatially switched retarder having a fixed optic axis orientation, and a retardance that varies between at least zero and a half-wave as a function of position on the spatially switched retarder.

The passive retarder 10 and the spatially switched retarder 200 can be implemented with any birefringent material. Desirable characteristics for the birefringent material include low-cost, large area, uniform, thin, and durable under high illumination levels and harsh environments. Potential linear retarder technologies include form-birefringence structures, crystalline retarders, stretched polymer retarder sheets, and liquid crystal polymer films.

Form birefringence devices are based on periodic structures with features smaller than a wavelength. A grating with sufficiently high spatial frequency, for instance, does not diffract light from the zero order, and has optically distinct path lengths parallel and perpendicular to the grooves.

Conventional crystalline retarder materials, such as quartz, mica and calcite, are well suited to applications requiring higher resolution than is feasible with polymer films. They are also useful for applications requiring low wavefront distortion, and/or high power handling requirements. They are more expensive than polymer retarders and do not lend themselves to large area, particularly when low retardances are required.

Polymers are chemical compounds or mixtures of compounds consisting of repeating structural units formed by chemical reaction, where two or more small molecules combine to form larger molecules. Retarders can be formed using sheets of oriented organic polymers. By unidirectional or bidirectional stretching of polymer films at elevated temperatures, a linear birefringence can be induced. For most materials, such as polyvinyl alcohol or polycarbonate, the refractive index increases in the direction of the stretch, typically forming a positive in-plane uniaxial retarder. Materials such as polystyrene, and styrene derivatives (U.S. Pat. No. 5,430,565) give a negative in-plane birefringence after stretching. Such materials are useful for producing retarders with wide viewing angles. Retardation films exhibiting fixed retardation with off-normal view angles are produced using one of two techniques, biaxial stretching or compound retarders. The combination of a positive uniaxial film crossed with a negative uniaxial film of equal retardation results in a compound retarder with an isotropic, angle-insensitive retardation (U.S. Pat. No. 5,138,474).

As an alternative, a single layer biaxial film with a wide view angle can be fabricated using stretching along both x and z, as described in U.S. Pat. Nos. 5,242,456, 5,472,538, and 5,559,618, all of which are incorporated by reference herein in their entirety. Such stretching can produce a biaxial film with a z direction refractive index that is substantially intermediate between the in-plane refractive indexes. This single film behaves much like the two-layer film in providing a large isotropic view angle.

Stretched polymer films are available in arbitrary retardances typically from 0–2,000 nm, using a variety of materials with unique birefringence dispersion characteristics. Large sheets can be purchased at low cost, permitting large clear aperture filters. Polycarbonate is the most common material for display applications and is available from vendors such as Nitto Denko, Sumitomo, and Sanritz. Other materials, such as polyvinyl alcohol, can be purchased from Polaroid, Polarvision, Inc., and International Polarizer. High dispersion materials, such as polysulphone and polyarylate films, are available from Nitto Denko and Sumitomo. Several other polymer materials are potentially useful in producing retarders including, but not limited to, mylar, polyamide, polypropylene, polyethylene terapthalate, triacetate (tri-butyl-acetate), polytetrafluoroethylene, and polymethylmethacrylate.

The spatially switched retarder 200 can be implemented using spatially patterned polymer retarders. Such patterned retarder films can be fabricated by locally stressing an isotropic polymer film. Half-wave retarder stripes can be patterned on an isotropic substrate by locally stressing a film.

Liquid Crystal Polymers (LCP) are a class of polymers wherein liquid crystal monomers are incorporated into the macromolecular structure along the mainchain (backbone) or as side chain units. LCP's can be aligned by either mechanically rubbed surfaces, shearing, or by optical means. Optical methods involve first applying either linear photo-polymerizable (LPP) films or azo-based dyes in a polymer alignment layer.

If LPP films are used, (see Schadt, et al, Jpn. J. Appl. Phys. Vol. 34, pg. 3240–3249, 1995), the LPP materials are deposited on a substrate and then cured at an elevated temperature. The cured film is then subjected to polarized UV light. LCP's are then spun-on or coated onto the same substrate, and aligned with the orientation of the LPP film. The LCP's are then cross-linked by exposure to unpolarized UV light.

If azo-based dyes are used, (Shannon et al, Nature, Vol. 368, pg. 532–533, 1994), azo-dye molecules are intercalated into the polyamide alignment layer (or layers), which are deposited onto various substrates, e.g., glass, silicon, or others. A liquid crystalline monomer or polymer is either deposited onto one substrate, or sandwiched in between two substrates. The LC molecular director orients perpendicular to the direction of the polarized UV light which previously illuminated the alignment layer. Subsequent exposure will reorient the liquid crystals, which may be disadvantageous for some applications.

Liquid crystal polymer films, particularly UV cross-linkable polymer nematic retarders, are particularly suitable for forming retarders. An attractive feature is the ability to produce thin retarders, since the material can have high birefringence relative to stretched materials. This can permit the fabrication of multi-layer retarder stacks on a single substrate with low cost. Because the films can be patterned at arbitrary angles, there is no waste, as is the case when cutting stretched polymer films at angles. Each LCP layer can essentially be bonded to the previous layer, avoiding the need for applying pressure sensitive adhesives to each film.

Currently available LCP materials have a positive anisotropy. In order to produce a wide view angle LCP, a biaxial retarder is required. A single film would require a true biaxial LCP (P. Bladon et al., Macromolecules, 25, 4329 (1992)). An alternative is a two-layer compound retarder containing positive and negative birefringence LCPs. Yet another alternative is to take advantage of the out-of-plane tilt achievable with photoaligned LCP. By providing two identical parallel oriented LCP films with equal and opposite out-of-plane tilt angle, a compound retarder is formed with a view angle that is controlled by the tilt angle. At roughly 34-degrees, the off-normal dependence of retardation can be made to vanish in the plane containing the optic axis.

Because LCPs can be photoaligned, a spatially varying orientation, both in-plane and normal to the surface, can be achieved by photo-patterning. This is done using standard lithographic techniques.

Other L.P. materials are potentially useful for either retarder materials or for increasing the view angle. Discotic LCPs from Fuji and Nippon Oil Company are negative birefringence materials fabricated on a CTA substrate (H. Mori, Jpn. J. Appl. Phys., 36, 1068, (1997)). Some of the Discotic LCPs have the unique property that the optic axis has a splayed orientation.

The embodiments of FIGS. 3a–3d are preferred over the embodiment of FIG. 3e for several reasons. The construction of the embodiments of FIGS. 3a–3d are simpler because they use a single active liquid crystal cell or a spatially switched retarder instead of two active liquid crystal cells. In addition, the switching speed of smectic liquid crystals is typically orders of magnitude faster than nematic liquid crystals. In the following description of design parameters, the embodiments of FIG. 3a and 3c are used as the representative device. However, the design parameters apply to all of the embodiments of the present invention.

Achromatic Shutter

An achromatic shutter is produced when the 90-degree rotator is positioned between two polarizers, as shown in FIG. 4.

Input polarizer 30, positioned before the rotator switch, provides linearly polarized input light. In the illustrated embodiment, output polarizer 40, positioned after the rotator switch, is perpendicular to the input polarizer 30. In the rotator switch on-state, achromatic 90-degree rotation of the x-polarized input light results in a shutter on-state having high transmission through the y-oriented output polarizer 30. In the rotator switch off-state, the rotator appears isotropic and produces no rotation. The x-polarized input light is therefore blocked by the output polarizer 30, producing a shutter off-state.

In the case of parallel polarizers, the 90-degree rotating on-state of the rotator switch produces an off-state of the shutter, and vice versa. In general, if the dispersion of the two retarders 10 and 20 are reasonably matched, the isotropic state of the rotator switch is more achromatic than the 90-degree rotating state. Therefore, depending on whether maximum transmission of the shutter on-state or maximum blocking of the shutter off-state is desired, the polarizers 30 and 40 are selected to be parallel or crossed, respectively.

General Rotator

The achromatic polarization rotator of this invention can be designed to provide any angle of rotation, β. In the on-state of the general rotator, there are two half-wave retarders oriented at $$\alpha_1 = (\beta/4) + \epsilon \tag{1}$$

$$\alpha_2 = (3\beta/4) - \epsilon. \tag{2}$$

In one embodiment, one of the two retarders is rotatable or spatially switched, and the other is passive. In the off-state, the rotatable retarder is switched so that the two retarders are crossed. If the first retarder is active, it is switched to $\alpha_1' = \alpha_2 + \pi/2$, and if the second retarder is active, it is switched to $\alpha_2' = \alpha_1 + \pi/2$. If a spatially switched retarder is used in place of a rotatable retarder, one portion of the spatially switched retarder can be oriented in an off-state so that the off-state portion of the spatially switched retarder is crossed with respect to the passive retarder. If the first retarder is the spatially switched retarder, the off-state portion is oriented at $\alpha_1' = \alpha_2 + \pi/2$, and if the spatially switched retarder is the second retarder, the off-state portion is oriented at $\alpha_2' = \alpha_1 + \pi/2$.

In a second embodiment, both retarders are variable retarders having half-wave retardance in the on-state and zero retardance in the off-state.

Figure 5A:
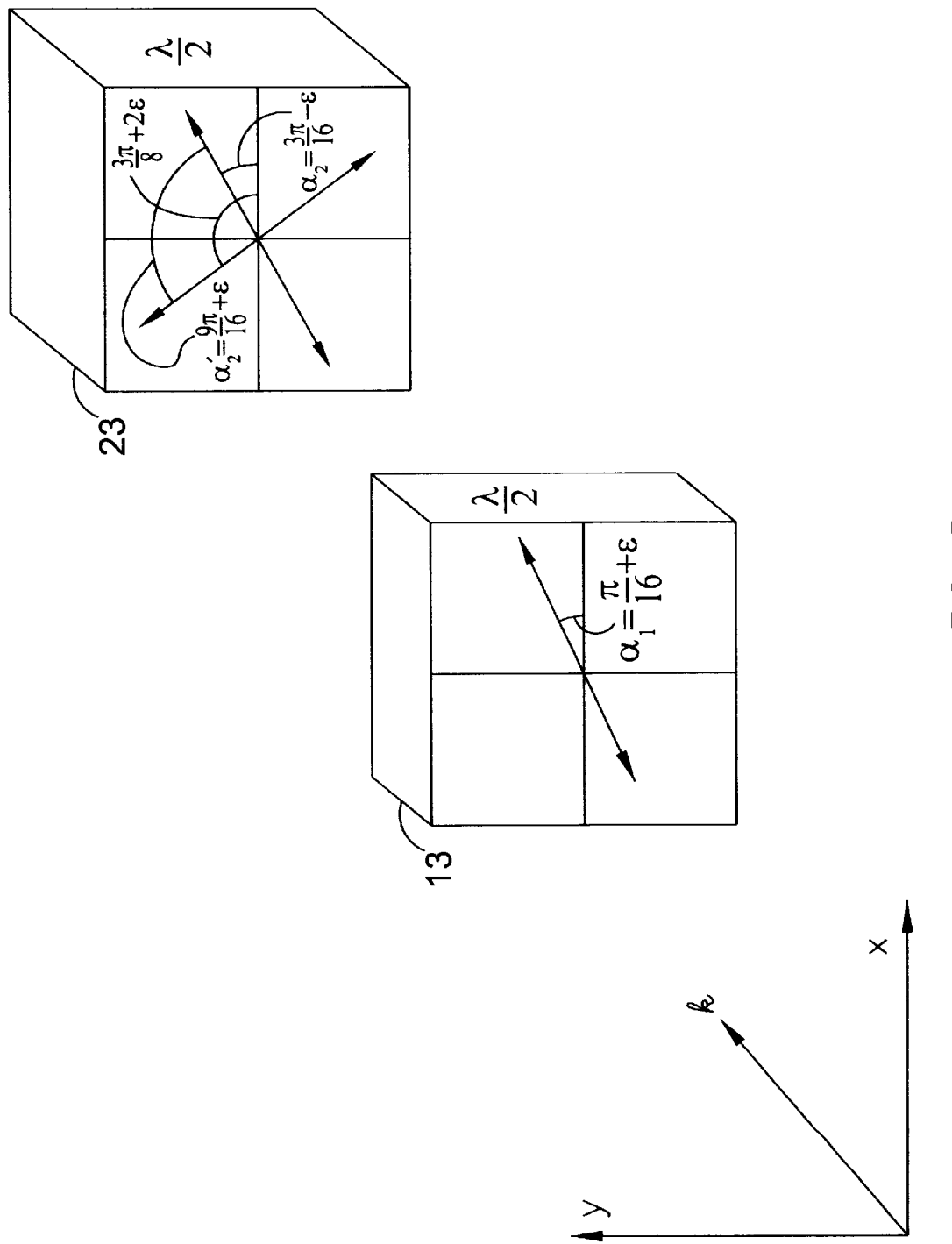
FIG. 5a illustrates a 45-degree achromatic rotator switch having $\eta=0$, in accordance with the present invention.

In a number of applications a 45° ($\pi/4$) rotation is desired. FIG. 5a shows a 45° achromatic rotator switch in accordance with the present invention. According to Equation 1 above, and as shown in FIG. 5a, retarders 13 and 23 are oriented at $\alpha_1=(\pi/16)+\epsilon$ and $\alpha_2=(3\pi/16)-\epsilon$ in the on-state. In the off-state, either the first retarder is switched to $\alpha_1'=-[(5\pi/16)-\epsilon]$ or the second retarder is switched to $\alpha_2'=(9\pi/16)+\epsilon$, either of which requires a $(3\pi/8)+2\epsilon$ (approximately 70°) rotation of the optic axis. Smectic liquid crystal cells are generally rotatable by less than about 50°. An aspect of this invention is the recognition that the difference between $\alpha_1$ and $\alpha_2$ can be increased by multiples of $\pi/2$ ($\pi/4$ change each) without changing the function of the rotator. For odd multiples of $\pi/2$, the sign of $\epsilon$ changes.

Thus, the equations defining the on-state of the more general rotator are $$\alpha_1 = \beta/4 + (-1)^\eta \epsilon - \eta\pi/4 \quad (2)$$

$$\alpha_2 = 3\beta/4 - (-1)^\eta \epsilon + \eta\pi/4, \quad (3)$$

where $\eta$ is a non-negative integer. Equations (2) and (3) above are for the case where both retarders exhibit either positive or negative in-plane birefringence. For the case where the first retarder exhibits a positive in-plane birefringence and the second retarder exhibits a negative in-plane birefringence, the equations defining the on-state of the more general rotator are $$\alpha_1 = \beta/4 + (-1)^\eta \epsilon - \eta\pi/4 \quad (4)$$

$$\alpha_2 = 3\beta/4 - (-1)^\eta \epsilon + \eta\pi/4 + \pi/2. \quad (5)$$

For the case where the first retarder exhibits a negative in-plane birefringence and the second retarder exhibits a positive in-plane birefringence, the equations defining the on-state of the more general rotator are $$\alpha_1 = \beta/4 + (-1)^\eta \epsilon - \eta\pi/4 + \pi/2 \quad (6)$$

$$\alpha_2 = 3\beta/4 - (-1)^\eta \epsilon + \eta\pi/4. \quad (7)$$

As discussed above, materials that provided a negative in-plane birefringence include polystyrene and styrene derivatives.

In the off-state, for the case in which both retarders exhibit a positive or a negative in-plane birefringence, and depending on which is the active or spatially switched retarder, either $$\alpha_2' = \alpha_1 + \pi/2 \quad (8)$$

or $$\alpha_1' = \alpha_2 + \pi/2. \quad (9)$$

In the off-state, for the case in which one retarder exhibits a positive in-plane birefringence and the other retarder exhibits a negative in-plane birefringence, and depending on which is the active or spatially switched retarder, either $$\alpha_2' = \alpha_1 \quad (10)$$

or $$\alpha_1' = \alpha_2. \quad (11)$$

Figure 5B:
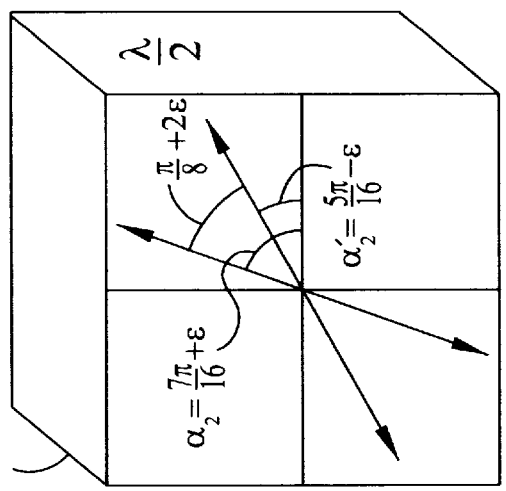
FIG. 5b illustrates a 45-degree achromatic rotator switch having $\eta=1$, in accordance with the present invention.
Figure 5B:
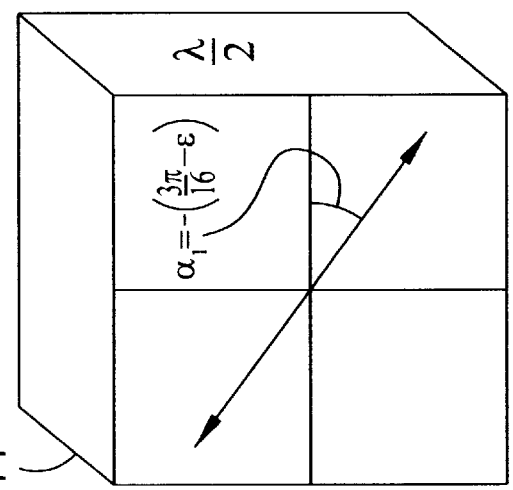
Figure 5B:
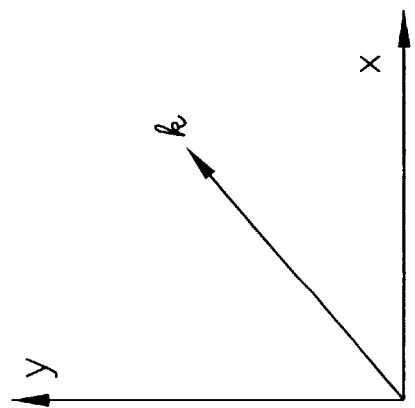

As shown in the 45° degree achromatic rotator switch of FIG. 5b, for the case of $\beta=45°$, when $\eta=1$, retarders 14 and 24 are oriented at $\alpha_1=-[(3\pi/16)-\epsilon]$ and $\alpha_2=(7\pi/16)+\epsilon$ in the on-state. In the off-state, either the first retarder 14 is switched to $\alpha_1'=-[(\pi/16)+\epsilon]$ or the second retarder 24 is switched to $\alpha_2'=(5\pi/16)-\epsilon$, either of which requires a $(\pi/8)+2\epsilon$ rotation of the optic axis. The same orientation of the optic axes in the off-state can alternatively be achieved by a $(7\pi/8)-2\epsilon$ rotation in the opposite direction. The selection of $\eta$ and the rotation direction can be based on the tilt angle of the available liquid crystal materials.

Design Optimization

In the following analysis, a Jones matrix is developed that propagates the optical field through the two-waveplate 90-degree rotator switch of the present invention. The specific on-state and off-state configurations are then evaluated based on the general equations. After the design equations are developed, the specific example of a shutter based on CSLC and polymer materials is analyzed. Other rotation angles can also be analyzed following this method.

In general, the Jones matrix propagating the complex Cartesian field amplitudes through the two-waveplate structure is given by $$W^1 = W(\Gamma_2, \alpha_2) W(\Gamma_1, \alpha_1),$$

where, $W(\gamma, \theta)$ represents the general Jones matrix for a linear retarder with retardation $\gamma$, and orientation, $\theta$ $$W(\gamma, \theta) = \begin{pmatrix} \cos\gamma/2 - i\cos2\theta\sin\gamma/2 & -i\sin2\theta\sin\gamma/2 \\ -i\sin2\theta\sin\gamma/2 & \cos\gamma/2 + i\cos2\theta\sin\gamma/2 \end{pmatrix}.$$

In the on-state, incident plane-polarized broadband light is ideally rotated to the orthogonal linear state. The analysis of the on-state is simplified by assuming that the two retarders are of identical material with a common center wavelength. Under this condition, the retardation can be written as $$\Gamma_1 = \Gamma_2 = \pi\delta,$$

where $\delta$ is the wavelength dependent departure from the ideal half-wave retardance.

Two design parameters are of importance when constructing a rotator: the difference angle between the retarder orientations, $(\alpha_2 - \alpha_1)$, which largely determines the rotation angle, and the orientation of the bisector, $(\alpha_2 + \alpha_1)/2$, which has a profound effect on the chromaticity of the structure.

For reasons that are clear by examination of the Poincare sphere transformations, a symmetric arrangement is chosen with the bisector oriented at $\pi/4$ or $$\alpha_1 = \alpha, \quad \alpha_2 = (\pi/2) - \alpha.$$

Multiplying the two Jones matrices gives the on-state matrix as $$W' = \begin{pmatrix} a & |b|e^{i\phi} \\ -|b|e^{-i\phi} & a \end{pmatrix},$$

where $$a = \sin^2(\delta/2) + \cos(4\alpha)\cos^2(\delta/2),$$

$$b = \sin(4\alpha)\cos^2(\delta/2) + i\sin\delta\sin(2\alpha)$$

and $$\phi = \tan^{-1}[\sec(2\alpha)\tan(\delta/2)].$$

At the design wavelength, the Jones matrix is a pure rotator, where the polarization rotation is twice the angle between the optic axes. This can be verified by substituting $\delta = 0$ into the above matrix.

For a 90-degree polarization rotation, $\alpha = (\pi/8 + \epsilon)$, giving $$\alpha_1 = (\pi/8) + \epsilon, \quad \alpha_2 = (3\pi/8) - \epsilon,$$

where $\epsilon$ is a small angle to be determined. This angle determines the extent to which the circular arcs, describing the transformations by each waveplate on the Poincare sphere overlap. At the two wavelengths that the arcs intersect, it will be shown mathematically that the rotator can be made to function as a perfect 90-degree rotator.

Figure 1:
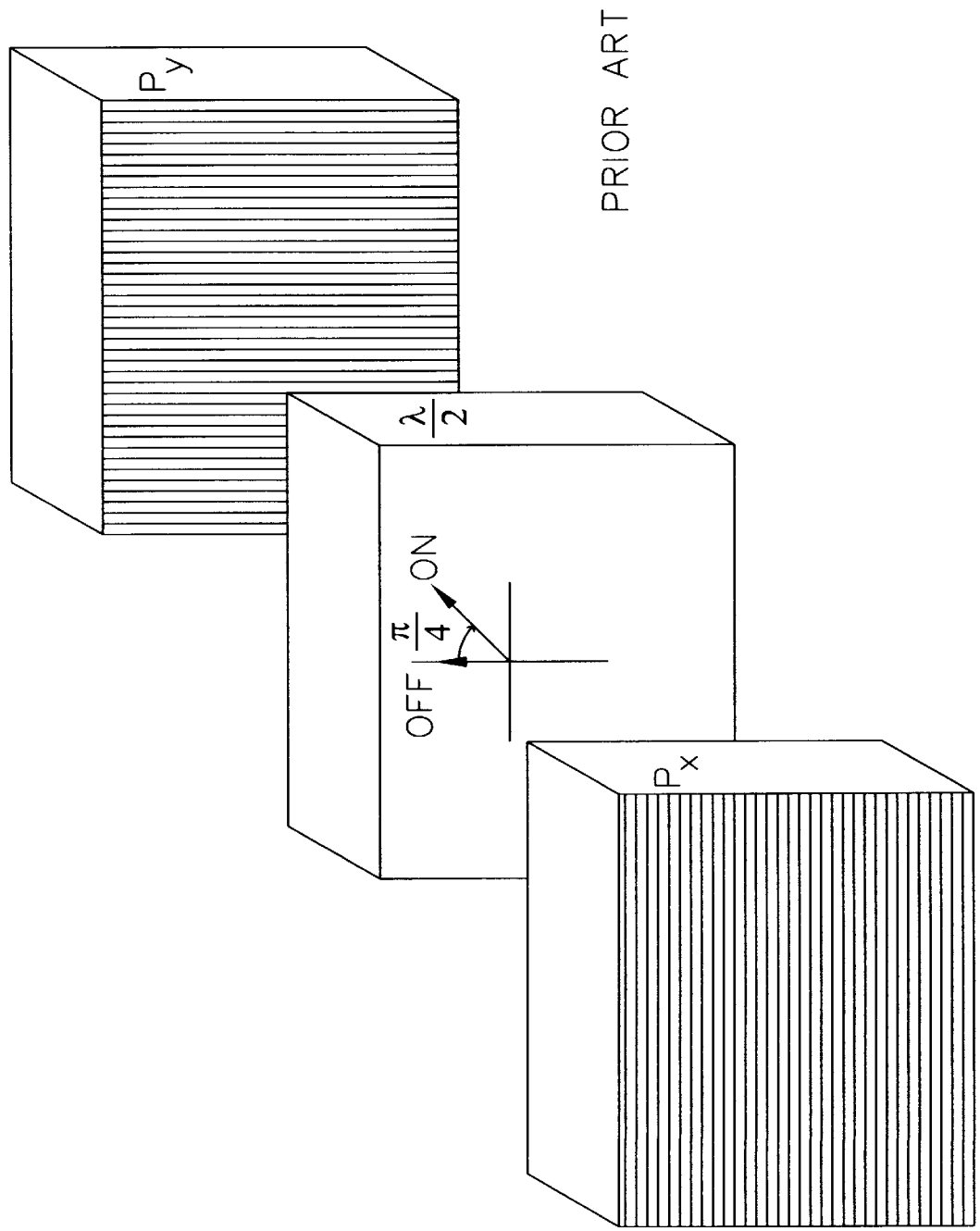
FIG. 1 is a light shutter comprising a CSLC cell between crossed polarizers.
Figure 6:
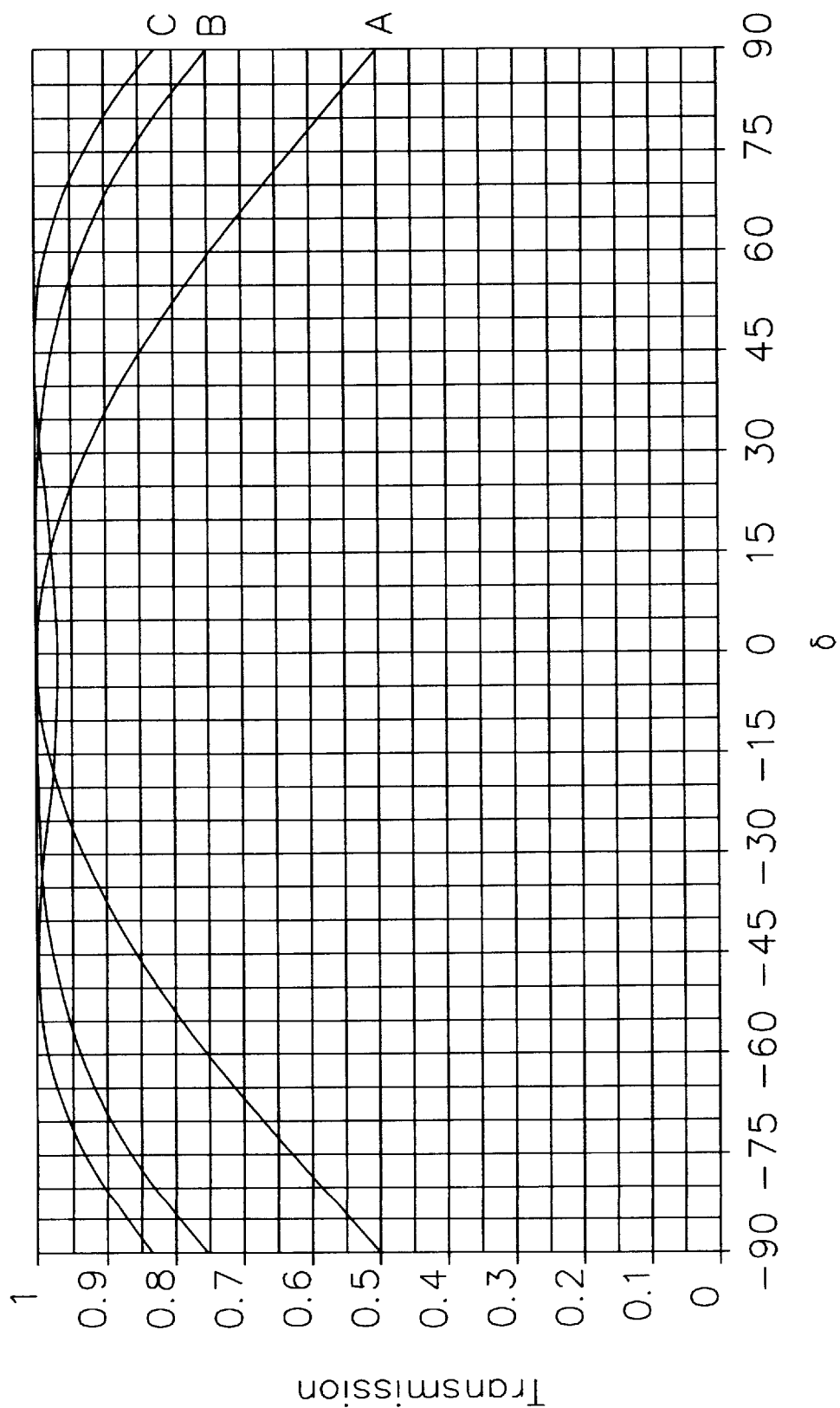
FIG. 6 is the on-state transmission versus departure from half-wave retardance ($\delta$) for (A) a simple CSLC shutter, and the achromatic rotator shutters of the present invention with (B) $\epsilon=0$ and, (C) $\epsilon=2.5°$.

Transmission functions of simple and achromatic shutter on-states are compared in FIG. 6. Prior art CSLC shutters, an example of which is shown in FIG. 1, provide an on-state transmission which is second-order in the deviation from the half-wave retardance $$T_{ON}(\delta) = 1 - \sin^2(\delta/2). \tag{13}$$

The transmission function of Equation 11 is graphed as plot A of FIG. 6. Very high contrast can be achieved using this scheme, though on-state transmission is quite chromatic. The latter prohibits high-contrast neutral off states in a parallel polarizer configuration. Furthermore, small thickness variations of the LC film over the aperture manifest themselves as highly visible birefringence color variations.

This behavior can be compared directly to that of the achromatic rotator structure using the Jones matrix of Equation 10. The transmission intensity of a crossed-polarizer shutter is given by the off-diagonal component, $T(\delta, \epsilon) = |b|^2$. This assumes x-polarized input light of unity amplitude, and an ideal y-oriented polarizer (unity transmission along the y-axis and infinite contrast). The transmission function simplifies to the general equation $$T_{on}(\delta, \epsilon) = 1 - [\sin^2(\delta/2) - \cos^2(\delta/2)\sin(4\epsilon)]^2 \tag{14}$$

While Koester considers rotators with $\epsilon = 0$ to be non-achromatic, it should be noted that considerable improvement is achieved with this arrangement over the conventional single-retarder scheme. Taking $\epsilon = 0$ in Equation 12 gives the intensity transmission between crossed polarizers as $$T(\epsilon, 0) = 1 - \sin^4(\delta/2).$$

The transmission function for $\epsilon = 0$ is graphed as plot B of FIG. 6. This rotator is similar to a single $\pi/4$-oriented retarder, in that it only fully transmits the orthogonal linear state at a single wavelength. However, considerable chromatic compensation is achieved by the symmetric arrangement of the rotator, which is not available with a single retarder. That is, elliptical polarization induced at a particular wavelength by one retarder is largely compensated by the second, though the reorientation of the polarization is doubled. This serves to broaden the operating band over single retarders, as evidenced by the fourth-order dependence on $\delta$.

Still broader operating bands are achieved by selecting a non-zero value for $\epsilon$, which increases the tilt-angle requirements. By examination of the general transmission expression of Equation 12, unity transmission is achieved for the condition $$\sin(4\epsilon) = \tan^2(\delta/2).$$

corresponding to two wavelengths of 90-degree polarization rotation. Substituting this relationship into the Jones matrix of Equation 10 reveals that, apart from a linear retardance of $2\Psi$, the matrix is that of a 90-degree rotator. In the case of an achromatic shutter, where x-oriented light is input and y-oriented light is transmitted, the transmission is in principle 100% at the two wavelengths. For more general inputs, the state of polarization is modified by the retardation $2\Psi$.

The sacrifice in performance for a broadened achromatic bandwidth is a transmission dip at the design wavelength of the retarders. This is because an increase in the value of $\epsilon$ represents a diminished rotation efficiency at the design wavelength. Substituting the design wavelength into the transmission function gives the transmission loss at the design wavelength as $$T_{on}(0, \epsilon) = \cos^2(4\epsilon).$$

Based on the dispersion of the retarder materials in the band of interest, and the choice of half-wave center wavelength, the selection of $\epsilon$ thus represents a compromise between operating bandwidth, and maintenance of rotation efficiency at the design wavelength.

The transmission function for $\epsilon = 2.5°$ is graphed as plot C of FIG. 6. The plot shows the clear separation of the unity transmission wavelengths and the transmission loss at the design wavelength.

To optimize the choice of small angle $\epsilon$, consider an example of a rotator switch based on dispersive material. In the small angle approximation, the achromatic condition is approximately $\epsilon = (\delta/4)^2$. This can be substituted into Wu's model (Phys. Rev. A 33, 1270 [1986]) for birefringence dispersion, giving the correction angle as a function of the achromatic wavelength(s), $\lambda_{R,B}$ $$\varepsilon = \left[\frac{\pi}{4}\frac{(\lambda_{R,B}\lambda_0 + \lambda^{*2})(\lambda_0 - \lambda_{R,B})}{\lambda_0(\lambda_{R,B}^2 - \lambda^{*2})}\right]^2, \tag{15}$$

where $\lambda^*$ is the mean UV resonance of the material and $\lambda_0$ is the half-wave design wavelength. Smectic C* materials, such as ZLI-3654 (E-Merck), have tilt angles of 25-degrees at room temperature, allowing a value of $\epsilon = 2.5°$. Using Equation 13, this gives ideal efficiency at $\lambda_B = 435$ nm, and $\lambda_R = 615$ nm, with a spectral separation of 179 nm. The maximum preferred value of $\epsilon$ is that angle which gives $\lambda_B$ and $\epsilon_R$ at the edges of the desired operating range of the rotator. Preferably the two transmission maxima fall further inside the operating range so that transmission throughout the range is maximized. Typically $0 \leq \epsilon \leq 5°$.

In selecting the appropriate materials, account must be taken of the dispersion of the CSLC material and the degree with which the two materials are dispersion matched for optimum off-state performance. If two half-wave positive uniaxial retarders are used, the off-state of the device is produced when the two retarders are crossed, giving $$\alpha_1(\pi/8)+\epsilon, \alpha_2=(5\pi/8)+\epsilon,$$

as shown in FIG. 3a. If the first half-wave retarder is a negative uniaxial retarder and the second half-wave retarder is a positive uniaxial retarder, the off-state of the device is produced when $$\alpha_1=(5\pi/8)+\epsilon, \epsilon_2=(5\pi/8)+\epsilon,$$

and the on-state of the device is produced when $$\alpha_1=(5\pi/8)+\epsilon, \alpha'_2=(3\pi/8)-\epsilon.$$

Neglecting other sources of loss, and assuming crossed retarders with identical half-wave center wavelength, the Jones matrix of the off-state is easily described as a linear retarder with orientation $\alpha=(5\pi/8)+\epsilon$, and retardation $\Delta=(\delta_2-\delta_1)$. Provided that the dispersion of the retarders is matched, the off-state is ideal. In practice, contrast is diminished by spatial variations in LC thickness and lack of dispersion matching between active and passive films.

When the rotator is composed of materials with dissimilar birefringence dispersion, or if the center wavelengths are not identical, residual retardance degrades the contrast. Consider a shutter device composed of a CSLC film and a passive film of dissimilar characteristics, but identical half-wave center wavelength. Using Wu's model for birefringence, where each material has a specific resonance wavelength, the retardance is given by $$\Delta = \pi \frac{\lambda}{\lambda_0}\left[\frac{(\lambda^2-\lambda_0^2)(\lambda_2^{*2}-\lambda_1^{*2})}{(\lambda^2-\lambda_1^{*2})(\lambda^2-\lambda_2^{*2})}\right],$$

where $\lambda_1^*$ and $\lambda_2^*$ are the mean UV resonance wavelengths for the two materials. Based on the orientation given for the off-state of the shutter, the Jones matrix gives the intensity transmission of the structure between crossed polarizers $$T_{OFF}=\frac{1}{2}[1+\sin(4\epsilon)]\sin^2(\Delta/2).$$

This equation gives the criteria for dispersion matching between the two retarders.

EXAMPLE 1

Consider the design of a visible-band shutter using the achromatic rotator switch between crossed-polarizers, and having the following performance specifications and material characteristics:

Liquid Crystal: $\lambda^*=243$ nm

Passive retarder: Nitto NRF polycarbonate with $\lambda^*=186$ nm

Design Wavelength: $\lambda_0=500$ nm

Spectral Coverage: >97% transmission for 430–680 nm

Contrast Ratio: 100:1 minimum.

Figure 7:
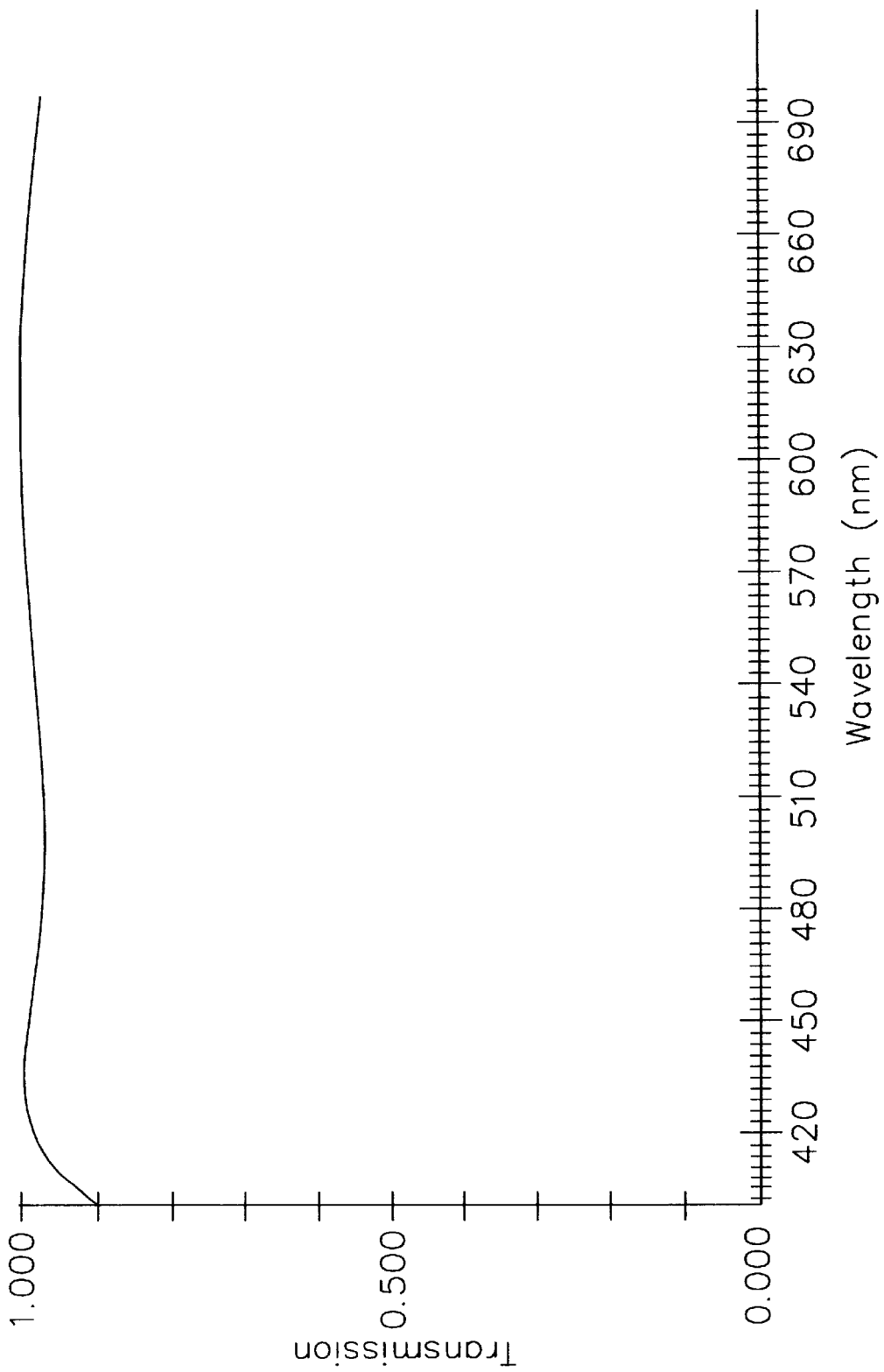
FIG. 7 is the calculated on-state transmission spectrum of a crossed polarizer shutter using a visible band achromatic rotator switch, in accordance with the present invention.

Using the previous analysis, a CSLC which modulates orientation between 65° (on-state) and 115° (off-state) is appropriate. The passive retarder film is oriented at 25° with respect to the input polarizer. The computer model on-state and off-states generated from the above values are shown in FIGS. 7 and 8, respectively.

Using this choice of $\epsilon$ (2.5°), the transmission dip is 3% at the design wavelength. The achromatic bandwidth is taken to be defined by the extreme blue/red wavelengths corresponding to a 3% loss in transmission. From FIG. 7, this occurs at wavelengths less than 415 nm and wavelengths greater than 700 nm, respectively, which corresponds to an achromatic bandwidth exceeding 285 nm. For comparison sake, the prior art CSLC shutter centered at 500 nm has a 97% bandwidth of 70 nm (469 nm to 539 nm). Thus the achromatic shutter of the present invention gives a more than four-fold enhancement in achromatic bandwidth over a prior art CSLC shutter.

Figure 8:
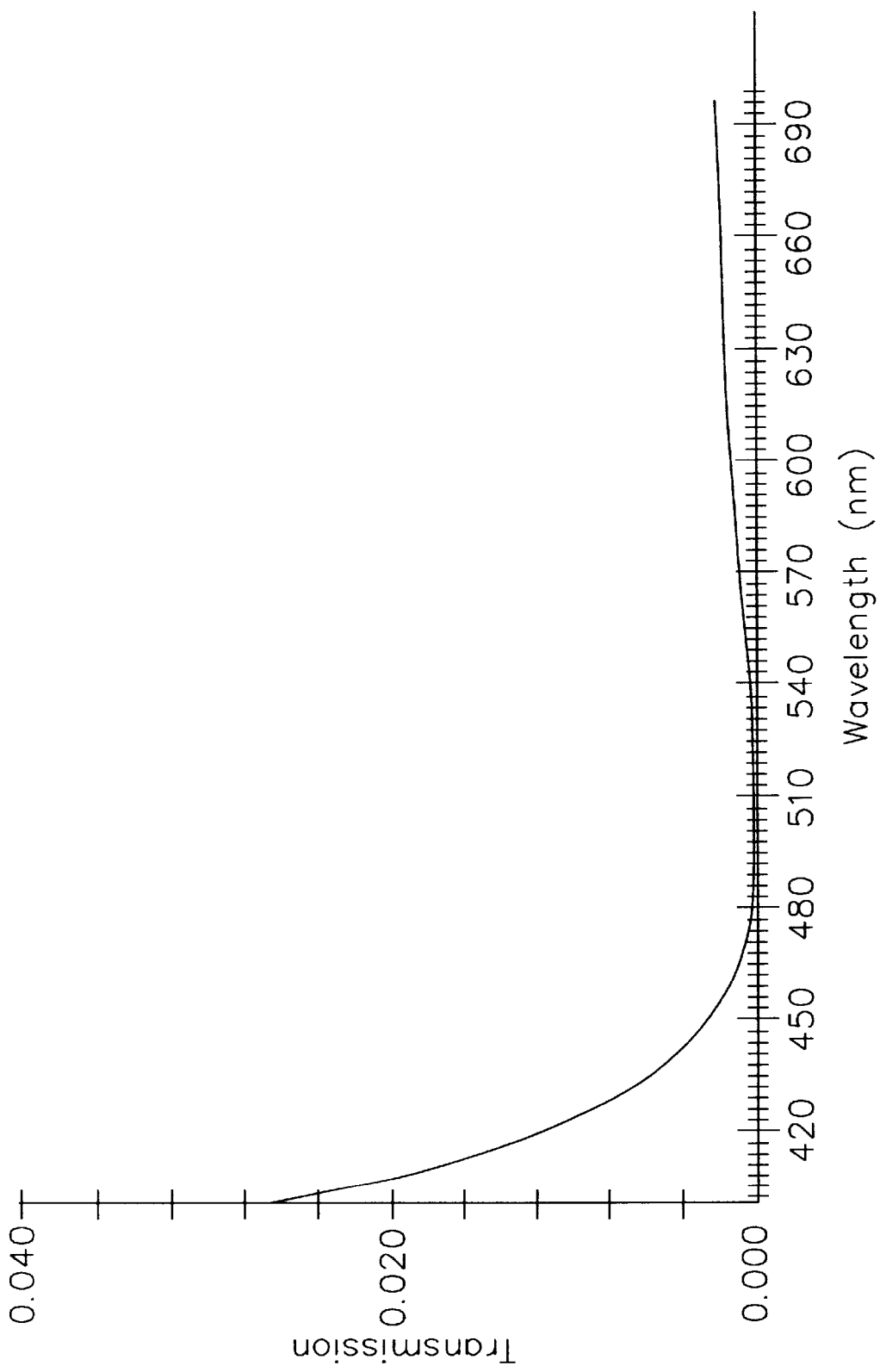
FIG. 8 is the calculated off-state transmission spectrum of the achromatic shutter of FIG. 7.

The calculated off-state transmission is shown in FIG. 8. This plot shows that the contrast remains above 500:1 over a 177 nm range (455 nm to 632 nm), and above 200:1 over a more than 262 nm range (438 nm to greater than 700 nm). For wavelengths longer than the design wavelength, the contrast degrades very slowly. However, a rapid degradation in contrast occurs at the extreme blue wavelengths due to explicit increased wavelength sensitivity as well as dispersion sensitivity. For instance, the contrast drops from 200:1 to 36:1 over 38 nm (438 nm to 400 nm). If necessary, this can be somewhat compensated by reducing the design wavelength.

An achromatic shutter was experimentally demonstrated to verify the performance predicted by computer modeling. The CSLC device was fabricated using ZLI-3654 material from E-Merck. The ITO (indium tin oxide) coated 44-mil thick substrates were spin coated with nylon 6/6 and were rubbed unidirectional after annealing. Glass spacers with a diameter of 1.9 microns were dispersed uniformly over the surface of one substrate and UV cure adhesive was printed on the inner surface of the other substrate. The substrates were gapped by applying a uniform pressure and subsequently UV cured. The CSLC material was filled in a vacuum under capillary action in the isotropic phase and slowly cooled into the C* phase. After cooling, leads were attached to the ITO and the device was edge-sealed. The CSLC cell had a half-wave retardance at approximately 500 nm.

The structures were probed by illuminating with quasi-collimated light from an Oriel quartz halogen lamp, and the transmitted light was analyzed using an And spectrum analyzer system. Parallel Plan-Thompson polarizers were used for the input and output polarizers to provide broadband plane polarized input light and to analyze the output. The light source was initially analyzed and stored by the instrument with the input and output polarizers inserted. The achromatic rotator switch of the present invention was subsequently inserted between the input and output polarizers and mechanically rotated during 1 Hz modulation until high contrast was obtained. The output represents the characteristics of the rotator switch, as well as loss by two Fresnel surfaces and the two ITO films.

Figure 2:
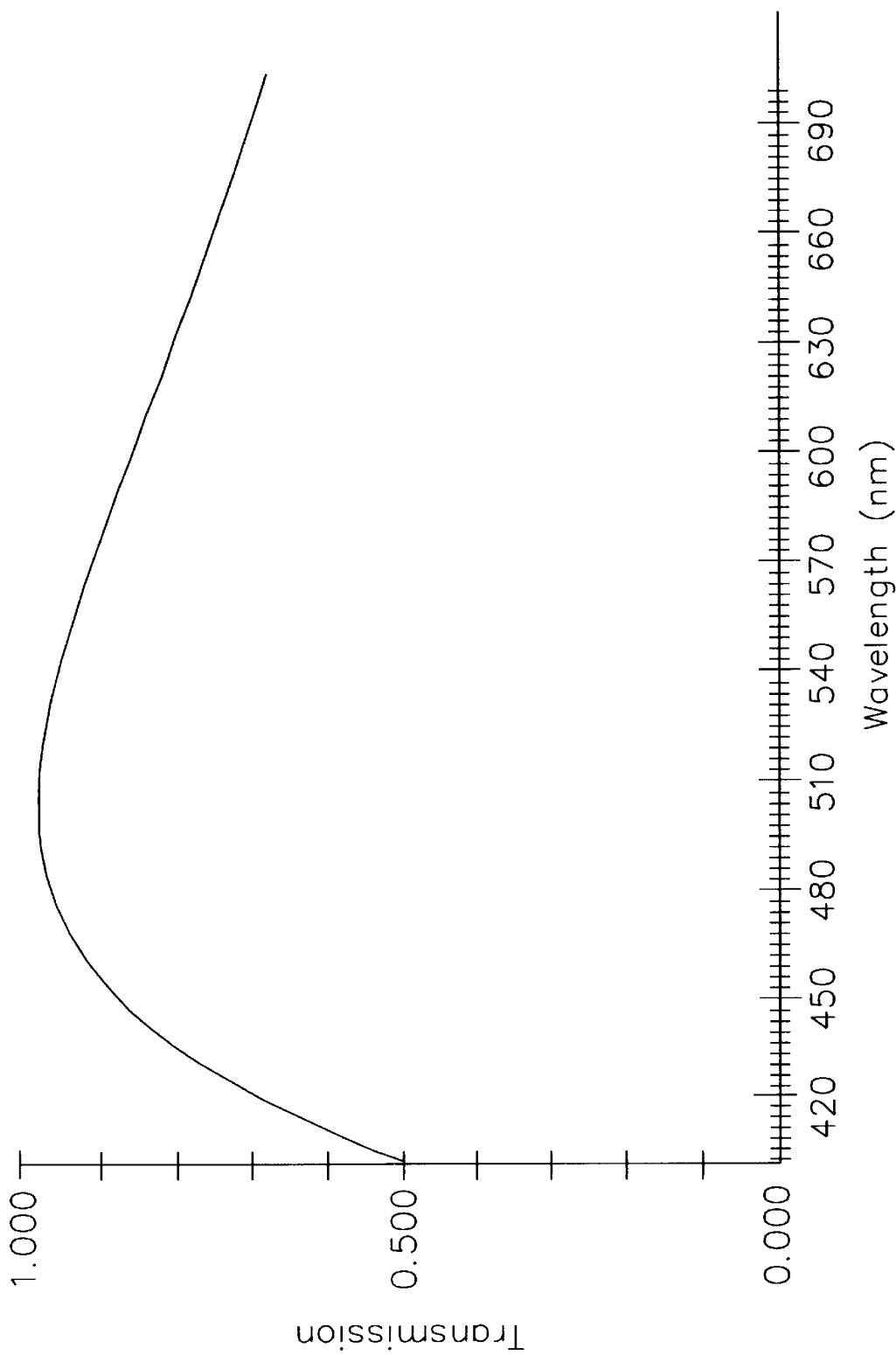
FIG. 2 is computer model output for the on-state of the shutter of FIG. 1.
Figure 9A:
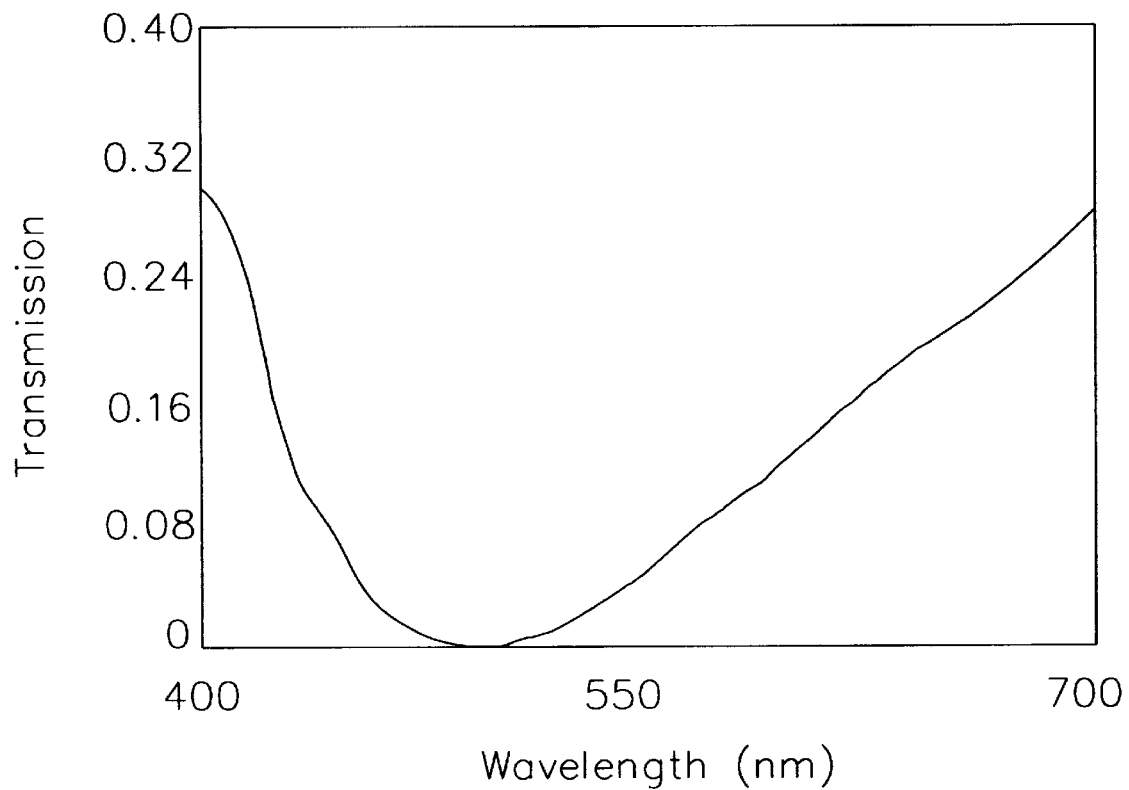
FIG. 9a is the measured shutter off-state transmission spectra for a single CSLC retarder oriented at $\pi/4$ between parallel polarizers.

Prior to assembling into an achromatic rotator, the liquid crystal device was used to verify the theoretical result of FIG. 2. The device was switched between on- and off-states between parallel polarizers. The devices are driven by a 5 volt 1 Hz square wave while the spectrum is scanned to avoid DC drift in the orientation of the molecular director. Since the input and output polarizers were parallel with respect to each other, the spectra are inverted with respect to FIG. 2 and it is the off-state which is chromatic, as shown in FIG. 9a. Since the device is a half-wave retarder at a single wavelength, a high-contrast null was observed at 500 nm, with significant leakage at other visible wavelengths.

Subsequently, the CSLC device was assembled into an achromatic rotator. The device was placed in a light box consisting of crossed input and output polarizers with a fluorescent backlight. With a 5 volt amplitude signal, the device was square-wave modulated at 20 Hz and rotated until zero flicker was observed. This corresponds to symmetric switching of the molecular director with respect to the polarizer. The device was then fixed in this orientation and the modulation rate reduced to under 1 Hz. A film of Nitto adhesive backed NRF polycarbonate retarder (half-wave at 500 nm) was then placed above the device and the output observed as it was rotated. When the retarders were in the crossed configuration, a high contrast neutral null was observed. The alternate polarity produced a neutral on-state.

By changing the analyzer to a parallel polarizer configuration, the neutrality and contrast of the alternate state was observed. Ideally, the 90-degree rotation state yields a high contrast null between parallel polarizers. When both states were satisfactory, the CSLC substrate was cleaned with IPA and the retarder deposited. This was done by mechanically rolling the film on from one edge to avoid trapping air bubbles. After this step, the device was analyzed using the diagnostic setup described above.

Figure 9B:
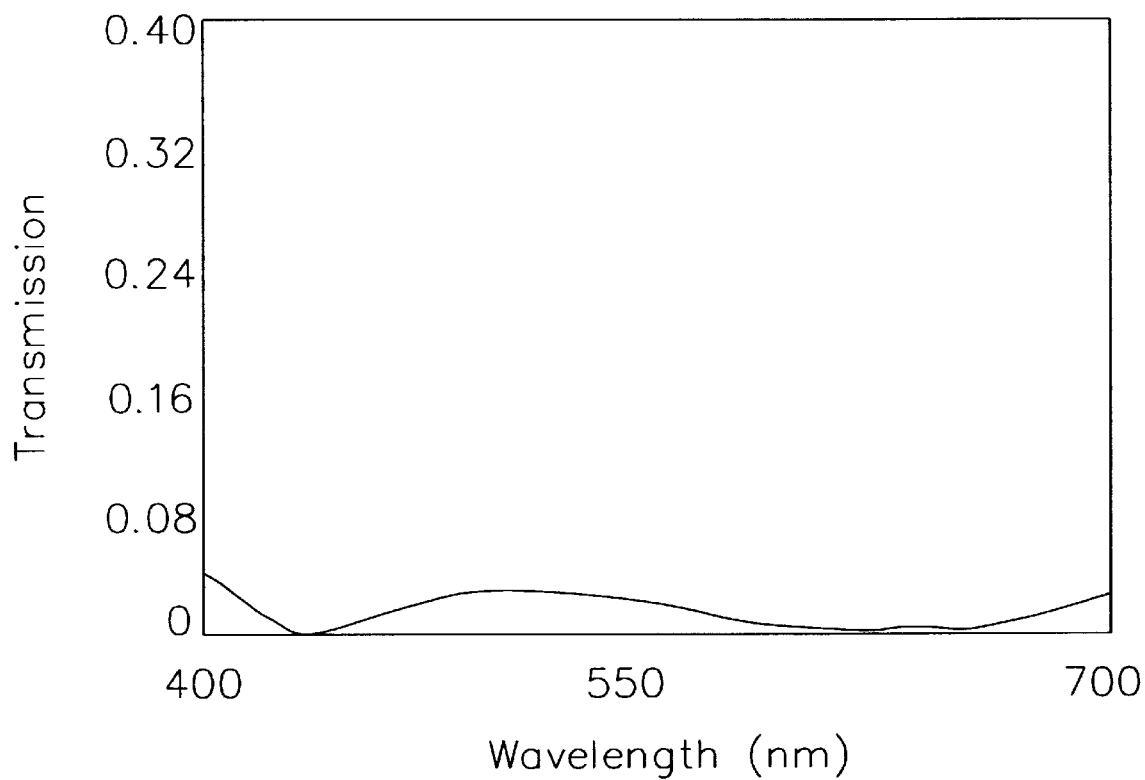
FIG. 9b is the measured shutter off-state transmission spectra for the achromatic rotator switch of the present invention between parallel polarizers.
Figure 10:
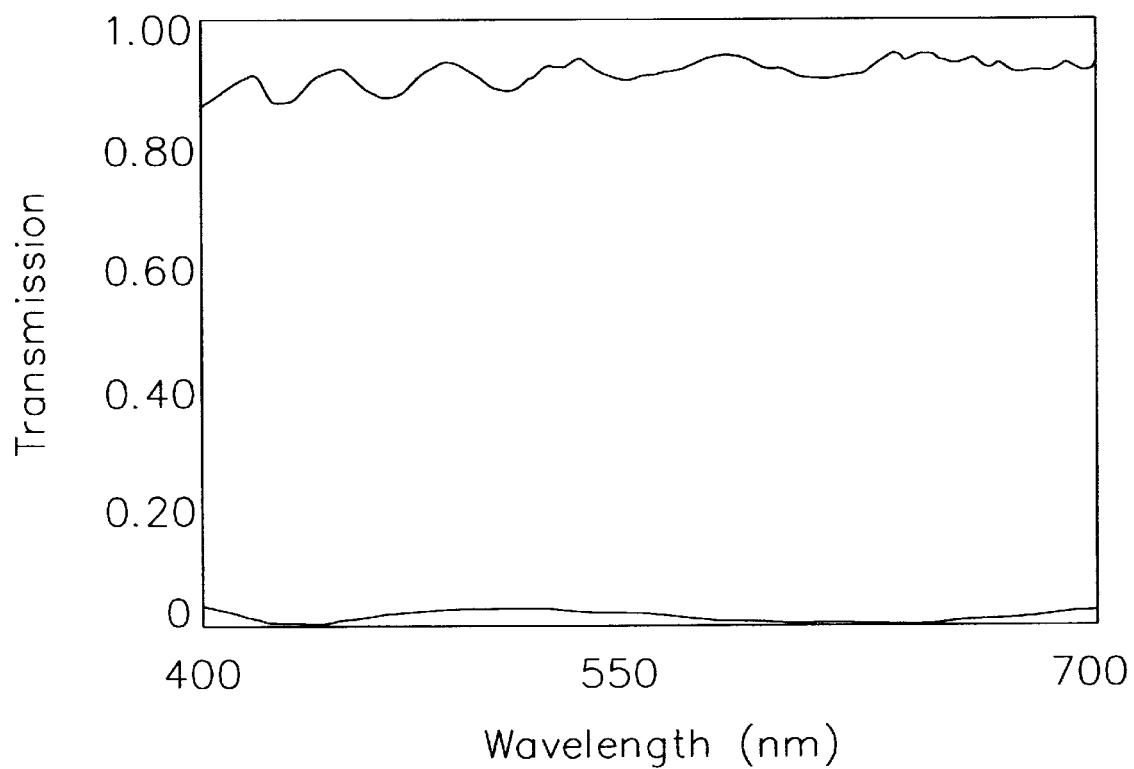
FIG. 10 shows the measured on- and off-state spectra of the shutter of FIG. 9b, which illustrates that thigh-transmission is obtained in the isotropic state, while a neutral off-state is obtained in the $\pi/2$ rotation state.

The parallel-polarizer transmission of the achromatic rotator is shown in FIGS. 9b and 10. With parallel input and output polarizers, the off-state of the shutter is achieved when the rotator switch is a 90° rotator, and the on-state corresponds to the crossed-retarder isotropic configuration. The off-state is in excellent agreement with the (inverted) model results of FIG. 7. FIG. 9b clearly shows the two null wavelengths predicted by the design analysis, and the leakage at the design wavelength. The two nulls produce performance that is much improved relative to the single retarder modulator of FIG. 9a. The leakage at the design wavelength and at the operating band edges is 3%, which optimizes performance over the entire visible spectrum. For a narrower operating band a smaller $\epsilon$ can be used, which provides better performance. Typically, $\epsilon \leq 3°$, and for very narrow operating bands, $\epsilon=0$.

FIG. 10 shows both the on- and off-states of the device between parallel input and output polarizers. High transmission in the on-state is expected, since the retarders are in the crossed position. The modulation of transmission and increased loss in the blue, shown in the on-state, are due to the Fabry-Perot enhancement of the ITO film reflection.

EXAMPLE 2

Using the achromatic shutter at longer center wavelengths, where CSLC dispersion is greatly reduced, enormous operating bands are feasible. For instance, the calculated 97% transmission bandwidth of a shutter centered at 600 nm is approximately 400 nm (480 nm–880 nm), while that for a prior art CSLC shutter is only 150 nm (540 nm–690 nm).

Figure 11:
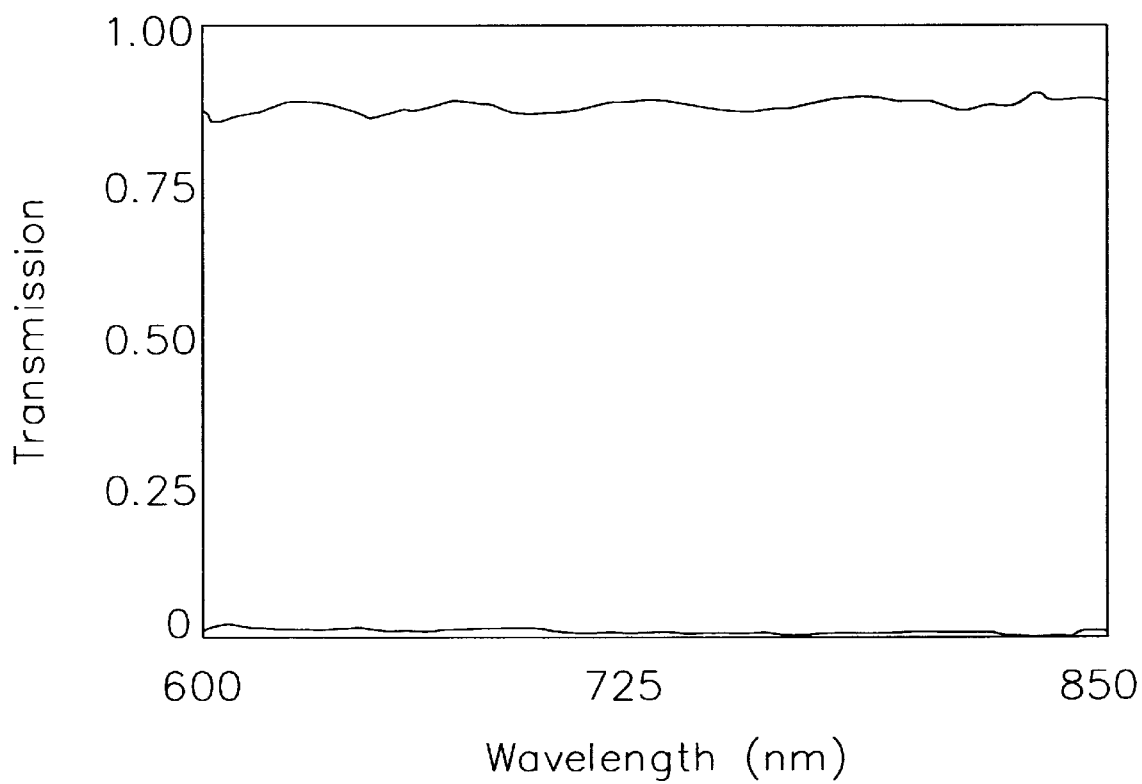
FIG. 11 shows the measured on- and off-state output of an achromatic shutter between parallel polarizers, in accordance with the present invention.
Figure 12:
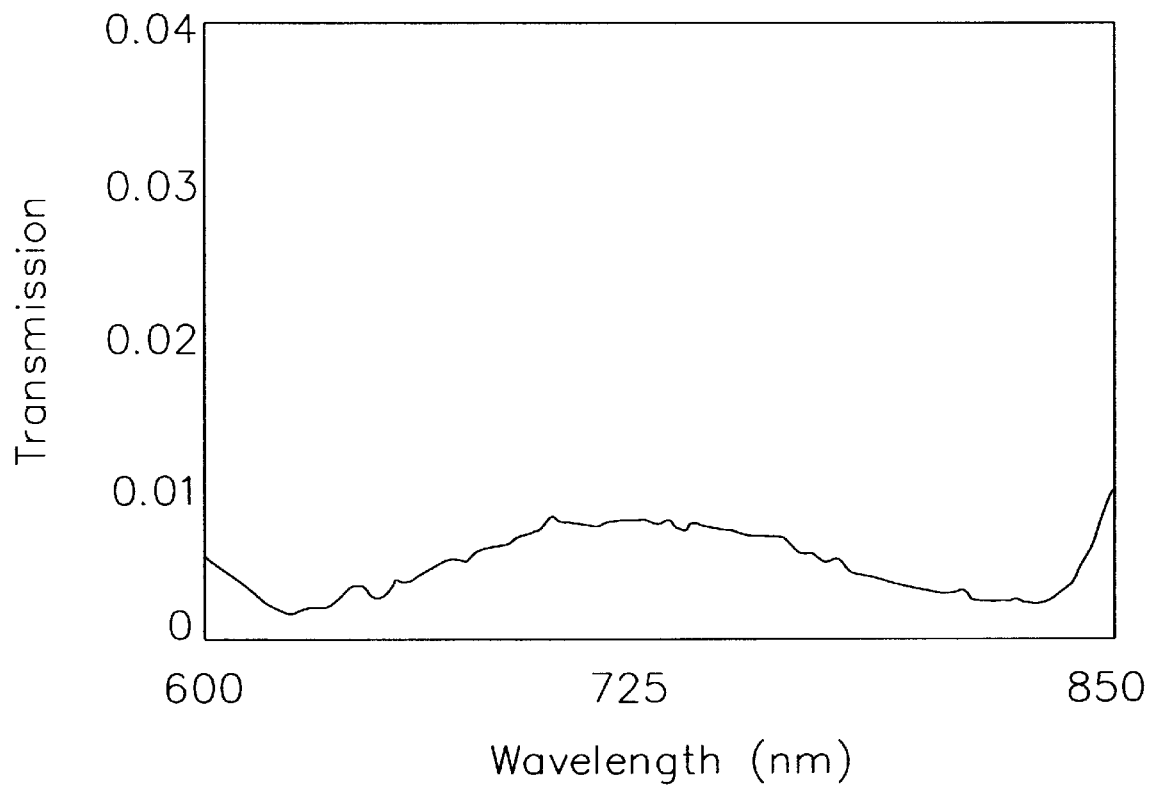
FIG. 12 is a high-resolution plot of the transmission of the shutter of FIG. 11, illustrating that the parallel polarizer leakage remains below 1.0% for a 250 nm band spanning 600 nm to 850 nm.

A long wavelength achromatic rotator, having a design wavelength of 730 nm, was constructed in the fashion described for Example 1 above. FIGS. 11 and 12 show the measured transmission of the achromatic rotator between parallel input and output polarizers. The achromatic rotator was fabricated using a 720 nm half-wave CSLC 9 (E-Merck ZLI-3654) retarder and a Nitto 400 nm Polycarbonate retarder. The shutter was optimized to provide high parallel polarizer efficiency for the 600 nm to 850 nm band. As shown in FIG. 12, less than 1% leakage is exhibited throughout this band.

Device Applications

The achromatic shutter of this invention can be utilized in applications such as CCD cameras, eye protection systems, glasses in virtual reality system, three-color shutters in field-sequential display, beamsteerers, diffractive optics and for increasing the brightness of LC flat-panel displays.

Figure 13:
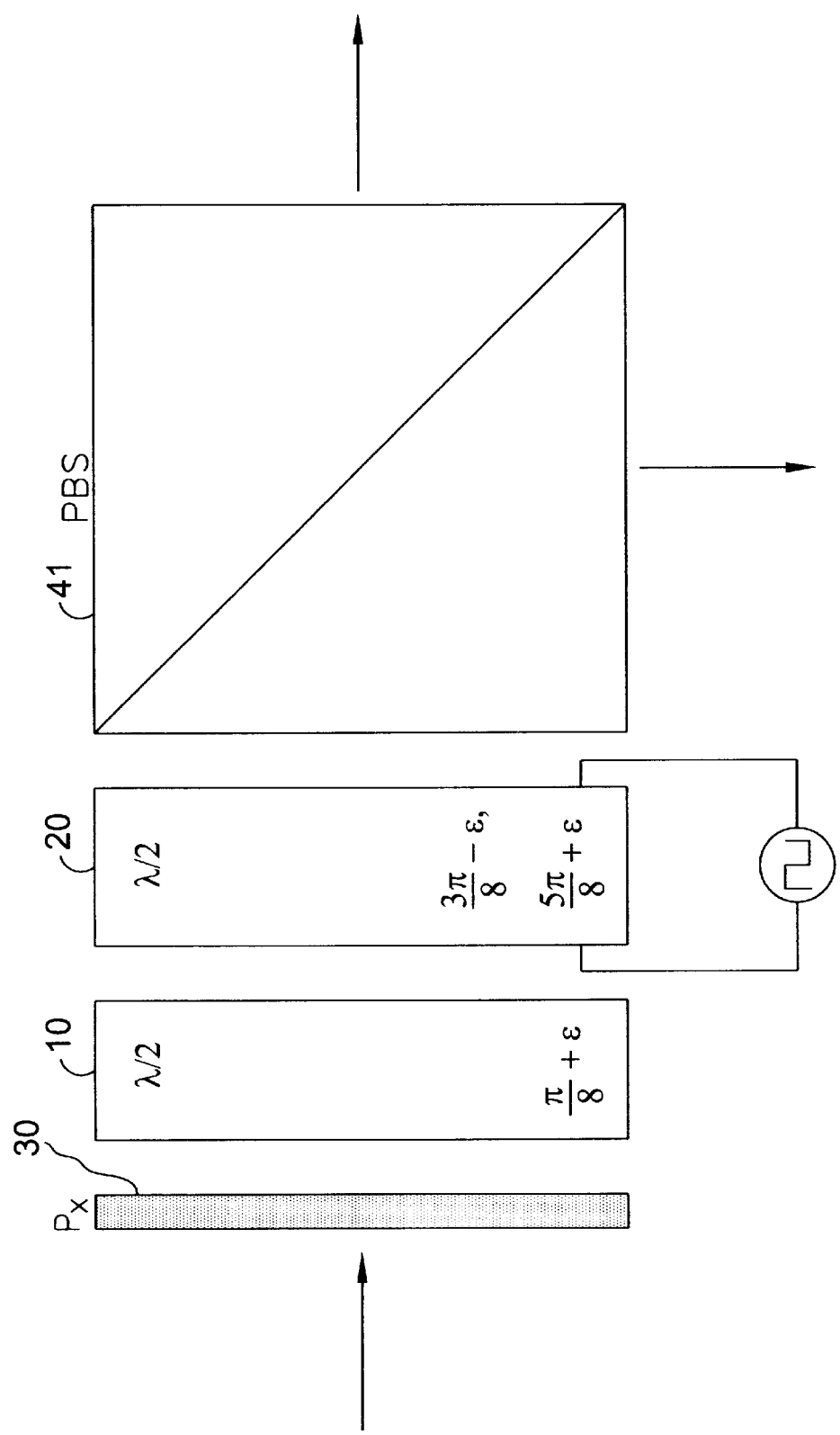
FIG. 13 shows a broad-band switching device, in accordance with the present invention, which uses a polarization splitter to direct light, and in which the port in which the broad-band light exits is switched by switching the polarity on the LC device.

The achromatic rotator can also be used in combination with polarization splitters for switches, and for polarization independent switches. By following the rotator switch with polarization splitter 41, as shown in FIG. 13, broadband light exits either of two ports by selecting the polarity of the applied electric field. In FIG. 13, optical elements are shown in cross-section and are represented by rectangular boxes. The retardance of birefringent elements are listed at the top of the box and the orientation is at the bottom of the box. When elements can rotate between two or more orientations, both orientations are listed in the box and are separated by a comma. Because of the neutrality of the rotator, the parallel polarizer output provides a dark state when the crossed polarizer output yields a bright state, and a bright state when the crossed polarizer output yields a dark state. In addition, patterned polarizers can be used to modulate between on- and off-states of adjacent pixels using a device without patterned electrodes.

Figure 14:
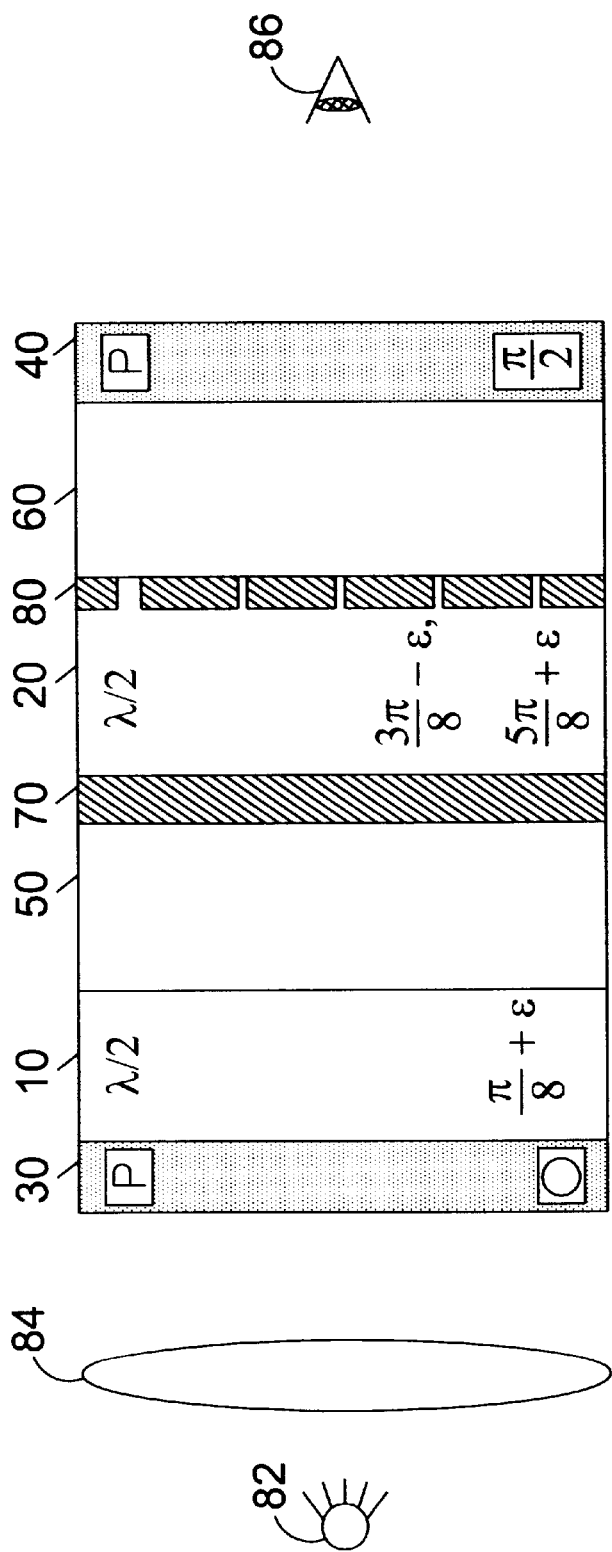
FIG. 14 is a display that incorporates the achromatic rotator switch of the present invention to produce shutter arrays that are more light efficient and neutral.

For many display applications, the achromatic shutter can be used in a multiple-pixel array, as shown in transmission-mode in FIG. 14. In this illustration the CSLC cell is formed between substrates 50 and 60. Voltages are applied using transparent electrode 70 and pixellated transparent electrode 80. The pixellated electrode can individually activate the pixels. In this embodiment polarizers 30 and 40 are crossed. However, the polarizers can be either parallel or crossed due to the neutrality of the achromatic rotator switch. The array is illuminated by a backlight assembly 82, which can be collimated by a lens 84. The display is viewed by an observer 86 in transmission mode.

Numerous devices known in the art can be improved by using the achromatic rotator of this invention. The criteria for replacing a single retarder with the achromatic rotator switch of this invention is that the single retarder must be a half-wave plate or otherwise function as a polarization rotator (for example a twisted nematic cell), and it must be positioned in the device in a location where the input polarization is linear and of a known orientation.

The achromatic rotator switch is particularly suited to applications where digital switching of broad-band light is required between known input and output polarization orientations. It is therefore especially suited for use in devices wherein it is positioned adjacent to a linear polarizer. While the function is the same as an achromatic variable retarder in a shutter application, a rotator cannot necessarily be used interchangeably with a variable retarder. For instance, the rotator switch may not function properly as an achromatic switch between passive retardation plates, where input polarization states are arbitrary.

The achromaticity of the rotator switch is particularly advantageous in color filtering devices because it can increase the throughput across the entire visible spectrum as well as the color contrast (which determines saturation). In the polarization interference filters disclosed in U.S. Pat. Nos. 5,132,826, 5,243,455 and 5,231,521, all of which are herein incorporated by reference in their entirely, a smectic liquid crystal rotatable retarder and a passive birefringent element, preferably oriented at 45°, are positioned between a pair of polarizers. In the split-element polarization interference filters disclosed in U.S. Pat. No. 5,528,393, issued on Jun. 18, 1996, which is herein incorporated by reference in its entirety, a center retarder oriented at 0 or 90° and a pair of split-element retarders oriented at ±45° are positioned between a pair of polarizers. Liquid crystal rotatable retarders are added to the split-element or center retarders. The individual liquid crystal rotatable retarders of the above-mentioned polarization interference filters can be replaced with the achromatic rotator switch of the present invention.

Figure 15:
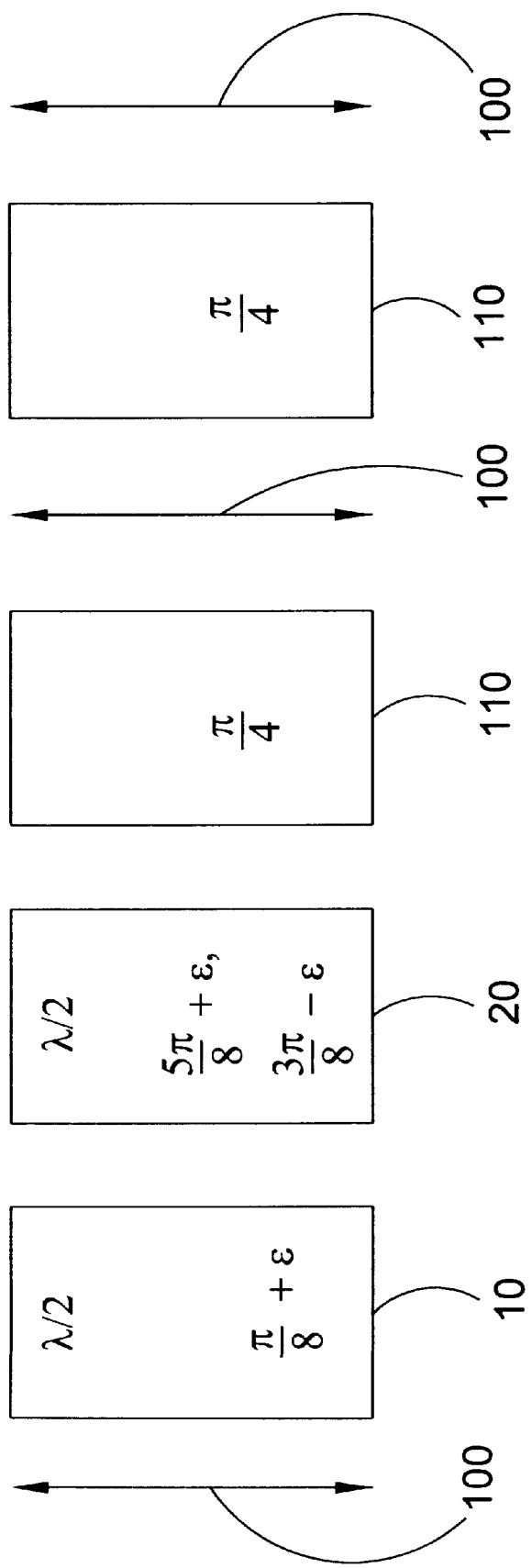
FIG. 15 shows a polarization interference filter that utilizes the achromatic polarization rotator of the present invention.

FIG. 15 shows a polarization interference filter utilizing the achromatic polarization rotator of the present invention. The polarization interference filter comprises linear polarizers 100, passive half-wave retarder 10, liquid crystal rotatable half-wave retarder 20, and passive retarders 110.

Figure 16:
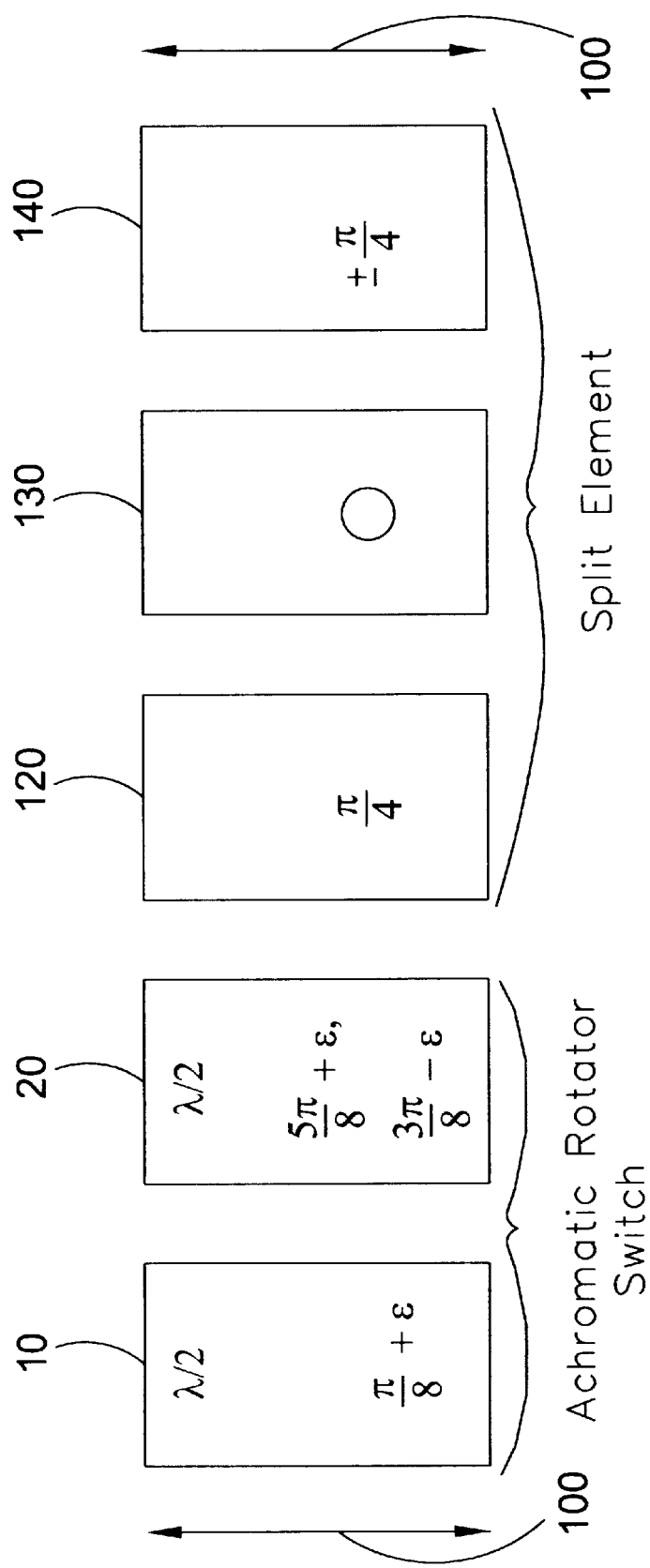
FIG. 16 shows split-element filter utilizing the achromatic polarization rotator of the present invention.

FIG. 16 shows a split-element filter utilizing the achromatic polarization rotator of the present invention. The split-element filter comprises linear polarizers 100, a passive half-wave retarder 10, a liquid crystal rotatable half-wave retarder 20, and split-element retarders 120, 130 and 140.

The liquid crystal handedness switch and color filters described in U.S. Pat. No. 5,619,355, issued on Apr. 8, 1997, which is herein incorporated by reference in its entirety, can also be improved by using the achromatic rotator of the present invention. A circular polarization handedness switch comprises a linear polarizer, a liquid crystal half-wave retarder rotatable between 0 and 45°, and a quarter-wave plate at 45°. The color filters use the handedness switch in combination with one or more color polarizers, such as cholesteric circular polarizers. The simple liquid crystal rotatable retarders described in the handedness switch invention can be replaced with the achromatic rotator switch of the present invention.

The achromatic rotator switch can further be used to improve color shutters based on linear polarization switches. A linear polarization switch comprises a first linear polarizer and a half-wave retarder rotatable between 0 and 45°. To make a color shutter, the linear polarization switch is followed by a second linear polarizer. Either the first, the second, or both linear polarizers are linear color polarizers. The linear color polarizer can be a pleochroic linear polarizer, as described in U.S. Pat. No. 5,619,355, or a polarizer retarder stack (PRS) color polarizer. A pleochroic polarizer film typically transmits a color on one polarization axis and white light on the other. Two films can be crossed and laminated to provide a color polarizer which transmits a different color on each axis. A PRS comprises a linear polarizer and two or more retarders, wherein the number of retarders in the stack and the retardances and orientations of the retarders are such that an additive primary color spectrum is transmitted along a first polarization axis and the complementary subtractive primary color spectrum is transmitted along a second, orthogonal, polarization axis. PRS technology is described in U.S. Pat. No. 5,751,384, which is herein incorporated by reference in its entirety. The rotator switch can be used as a replacement for the simple CSLC polarization switches as well as for the achromatic half-wave switches described therein.

Spatially switched achromatic rotators, such as those described above, can be used to effectively produce patterned polarizers. Such patterned polarizers are useful for direct view three-dimensional displays. They can also be used to produce spatially patterned color when combined with color polarizers. Patterned color is useful for color plates used in color image acquisition or display.

Figure 17:
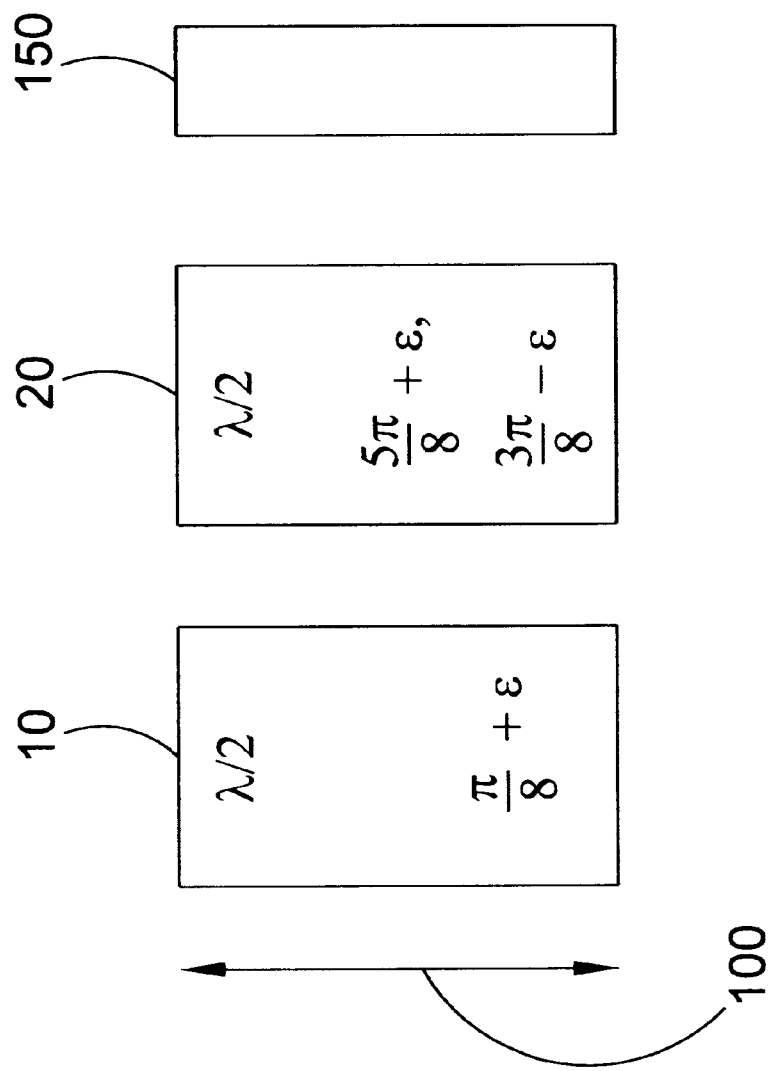
FIG. 17 is a color filter utilizing the achromatic polarization rotator of the present invention.

FIG. 17 shows a color filter utilizing the achromatic polarization rotator of the present invention. The color filter comprises a linear polarizer 100, a passive half-wave retarder 10, a liquid crystal rotatable half-wave retarder 20 and color polarizer 150. As discussed above, the color polarizer 150 may be a pleochroic linear polarizer or a PRS color polarizer, and preferably transmits a different color along each axis.

The achromatic rotator switch can also be used to improve other color filters known in the art, for example as described in Handschy et al., U.S. Pat. No. 5,347,378 and Sasaki, U.S. Pat. No. 5,089,905, which are herein incorporated by reference in their entirety. These color filters comprise a linear polarizer and a rotatable liquid crystal retarder. In some embodiments they further comprise pleochroic polarizers and in other embodiments they further comprise a second linear polarizer and a passive birefringent element. The simple liquid crystal rotatable retarder described in these references can be replaced with the achromatic rotator switch of the present invention.

Color filters using the rotator switch of this invention can be temporally multiplexed, wherein the output color is switched on a timescale which is rapid compared to a slow response time detector, such as the human eye. The color filters can also contain more than one stage, where a stage begins with a linear polarizer.

A multitude of further applications of the achromatic rotator switch and achromatic shutter of this invention will be readily apparent to those skilled in the art, and fall within the scope of this invention.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. For example, although the embodiments described herein all utilize retarders that exhibit a half-wave retardance at the design wavelength, it should be appreciated that the other retardance values can be used while still falling within the scope of the present invention and claims. As another example, although retardances and orientations of materials are often described and/or claimed in reference to design and/or center wavelengths as a matter of convenience, it should be understood that simply defining a design wavelength for the invention to be one or more wavelengths which yields values (of retardances and/or orientations, etc.) other than those specifically claimed does not avoid the claims, since there may be a different wavelength for which the range or ranges of values recited in the claims hold. It is those wavelengths and their associated values which must be considered in determining whether or not the device as a whole lies within the literal scope of the claims.

In the claims, means-plus-function clauses are intended to cover the structures described herein as performing the recited function and not only structural equivalents but also equivalent structures.

What is claimed is:

1. An achromatic polarization rotator for receiving input light that is at least partially polarized with a predetermined polarization and selectively rotating the polarization of the input light by a predetermined angle, comprising:
   a first retarder having a predetermined optic axis orientation with respect to the polarization of the input light; and
   an active retarder in series with the first retarder, wherein the active retarder has an optic axis orientation that is switchable between at least a first orientation state and a second orientation state, wherein one of the first and active retarders exhibits a negative in-plane birefringence and the other retarder exhibits a positive in-plane birefringence;

wherein, when the input light propagates through both the first retarder and the active retarder in series, the polarization of the input light is substantially achromatically rotated by the predetermined angle when the optic axis orientation of the active retarder is in the first orientation state, and is substantially unchanged when the optic axis orientation of the active retarder is in the second orientation state.

2. The rotator of claim 1, wherein the first retarder exhibits a positive in-plane birefringence and the active retarder exhibits a negative in-plane birefringence.

3. The rotator of claim 2, wherein the first retarder is positioned to receive the input light before the active retarder.

4. The rotator of claim 3, wherein:
the predetermined optic axis orientation of the first retarder is $\beta/4+(-1)^\eta \epsilon - \eta\pi/4$ with respect to the polarization of the input light; and
the first optic axis orientation state of the active retarder is $3\beta/4-(-1)^\eta \epsilon + \eta\pi/4 + \pi/2$ with respect to the polarization of the input light;
wherein $\eta$ is a non-negative integer, and $\epsilon$ is a small angle.

5. The rotator of claim 4, wherein the second optic axis orientation state of the active retarder is $\beta/4+(-1)^\eta \epsilon - \eta\pi/4$.

6. The rotator of claim 2, wherein the active retarder is positioned to receive the input light before the first retarder.

7. The rotator of claim 6, wherein:
the first optic axis orientation state of the active retarder is $\beta/4+(-1)^\eta \epsilon - \eta\pi/4 + \pi/2$ with respect to the polarization of the input light;
the predetermined optic axis orientation of the first retarder is $3\beta/4-(-1)^\eta \epsilon + \eta\pi/4$ with respect to the polarization of the input light;
wherein $\eta$ is a non-negative integer, and $\epsilon$ is a small angle.

8. The rotator of claim 7, wherein the second optic axis orientation state of the active retarder is $3\beta/4-(-1)^\eta \epsilon + \eta\pi/4$.

9. The rotator of claim 1, wherein the first retarder exhibits a negative in-plane birefringence and the second retarder exhibits a positive in-plane birefringence.

10. The rotator of claim 9, wherein the first retarder is positioned to receive the input light before the active retarder.

11. The rotator of claim 10, wherein:
the predetermined optic axis orientation of the first retarder is $\beta/4+(-1)^\eta \epsilon - \eta\pi/4 + \pi/2$ with respect to the polarization of the input light; and
the first optic axis orientation state of the active retarder is $3\beta/4-(-1)^\eta \epsilon + \eta\pi/4$ with respect to the polarization of the input light;
wherein $\eta$ is a non-negative integer, and $\epsilon$ is a small angle.

12. The rotator of claim 11, wherein the second optic axis orientation state of the active retarder is $\beta/4+(-1)^\eta \epsilon - \eta\pi/4$.

13. The rotator of claim 9, wherein the active retarder is positioned to receive the input light before the first retarder.

14. The rotator of claim 13, wherein:
the first optic axis orientation state of the active retarder is $\beta/4+(-1)^\eta \epsilon - \eta\pi/4$ with respect to the polarization of the input light;
the predetermined optic axis orientation of the first retarder is $3\beta/4-(-1)^{\eta+1} \epsilon + \eta\pi/4 + \pi/2$ with respect to the polarization of the input light;
wherein $\eta$ is a non-negative integer, and $\epsilon$ is a small angle.

15. The rotator of claim 14, wherein the second optic axis orientation state of the active retarder is $3\beta/4-(-1)^\eta \epsilon + \eta\pi/4$.

16. An achromatic polarization rotator for receiving input light that is at least partially polarized with a predetermined polarization and selectively rotating the polarization of the input light by a predetermined angle, comprising:
a first retarder having a predetermined optic axis orientation with respect to the polarization of the input light; and
a spatially switched retarder in series with the first retarder, wherein the spatially switched retarder comprises at least a first portion with a first optic axis orientation state, and a second portion with a second optic axis orientation state;
wherein, when the input light propagates through both the first retarder and the spatially switched retarder in series, the polarization of the input light is substantially achromatically rotated by the predetermined angle when the input light propagates through the first portion of the spatially switched retarder, and is substantially unchanged when the input light propagates through the second portion of the spatially switched retarder.

17. The rotator of claim 16, wherein the input light is at least partially linearly polarized.

18. The rotator of claim 16, wherein the input light is at least partially elliptically polarized.

19. The rotator of claim 16, wherein the first retarder and the spatially switched retarder each exhibit a positive or a negative in-plane birefringence.

20. The rotator of claim 19, wherein the second optic axis orientation state of the second portion of the spatially switched retarder is $\pi/2$ with respect to the optic axis orientation of the first retarder.

21. The rotator of claim 14, wherein the first retarder and the spatially switched retarder each provide a predetermined retardance at a design wavelength.

22. The rotator of claim 19, wherein the first retarder is positioned to receive the input light before the spatially switched retarder.

23. The rotator of claim 22, wherein:
the predetermined optic axis orientation of the first retarder is $\beta/4+(-1)^\eta \epsilon - \eta\pi/4$ with respect to the polarization of the input light; and
the first optic axis orientation state of the first portion of the spatially switched retarder is $3\beta/4=(-1)^\eta \epsilon + \eta\pi/4$ with respect to the polarization of the input light;
wherein $\eta$ is a non-negative integer, and $\epsilon$ is a small angle.

24. The rotator of claim 23, wherein the second optic axis orientation state of the second portion of the spatially switched retarder is $\beta/4+(-1)^\eta \epsilon - \eta\pi/4 + \pi/2$.

25. The rotator of claim 19, wherein the spatially switched retarder is positioned to receive the input light before the first retarder.

26. The rotator of claim 25, wherein:
the first optic axis orientation state of the first portion of the spatially switched retarder is $\beta/4+(-1)^\eta - \eta\pi/4$ with respect to the polarization of the input light; and
the predetermined optic axis orientation state of the first retarder is $3\beta/4-(-1)^\eta \epsilon + \eta\pi/4$ with respect to the polarization of the input light;
wherein $\eta$ is a non-negative integer, and $\epsilon$ is a small angle.

27. The rotator of claim 26, wherein the second optic axis orientation state of the second portion of the spatially switched retarder is $3\beta/4-(-1)^\eta \epsilon + \eta\pi/4 + \pi/2$.

28. The rotator of claim 16, wherein one of the passive and spatially switched retarders exhibits a negative in-plane birefringence and the other retarder exhibits a positive in-plane birefringence.

29. The rotator of claim 28, wherein the first retarder exhibits a positive in-plane birefringence and the active retarder exhibits a negative in-plane birefringence.

30. The rotator of claim 29, wherein the first retarder is positioned to receive the input light before the spatially switched retarder.

31. The rotator of claim 30, wherein:
the predetermined optic axis orientation of the first retarder is $\beta/4+(-1)^n\epsilon-\eta\pi/4$ with respect to the polarization of the input light; and
the first optic axis orientation state of the first portion of the spatially switched retarder is $3\beta/4-(-1)^n\epsilon+\eta\pi/4+\pi/2$ with respect to the polarization of the input light;
wherein $\eta$ is a non-negative integer, and $\epsilon$ is a small angle.

32. The rotator of claim 31, wherein the second optic axis orientation state of the second portion of the spatially switched retarder is $\beta/4+(-1)^n\epsilon-\eta\pi/4$.

33. The rotator of claim 24, wherein the spatially switched retarder is positioned to receive the input light before the first retarder.

34. The rotator of claim 33, wherein:
the first optic axis orientation state of the first portion of the spatially switched retarder is $\beta/4+(-1)^n\epsilon-\eta\pi/4+\pi/2$ with respect to the polarization of the input light; and
the predetermined optic axis orientation of the first retarder is $3\beta/4-(-1)^n\epsilon+\eta\pi/4$ with respect to the polarization of the input light;
wherein $\eta$ is a non-negative integer, and $\epsilon$ is a small angle.

35. The rotator of claim 34, wherein the second optic axis orientation state of the second portion of the spatially switched retarder is $3\beta/4-(-1)^n\epsilon+\eta\pi/4$.

36. The rotator of claim 28, wherein the first retarder exhibits a negative in-plane birefringence and the second retarder exhibits a positive in-plane birefringence.

37. The rotator of claim 36, wherein the first retarder is positioned to receive the input light before the spatially switched retarder.

38. The rotator of claim 37, wherein:
the predetermined optic axis orientation of the first retarder is $\beta/4+(-1)^n\epsilon-\eta\pi/4+\pi/2$ with respect to the polarization of the input light; and
the first optic axis orientation state of the first portion of the spatially switched retarder is $3\beta/4-(-1)^n\epsilon+\eta\pi/4$ with respect to the polarization of the input light;
wherein $\eta$ is a non-negative integer, and $\epsilon$ is a small angle.

39. The rotator of claim 38, wherein the second optic axis orientation state of the second portion of the spatially switched retarder is $\beta/4+(-1)^n\epsilon-\eta\pi/4$.

40. The rotator of claim 37, wherein the spatially switched retarder is positioned to receive the input light before the first retarder.

41. The rotator of claim 40, wherein:
the first optic axis orientation state of the first portion of the spatially switched retarder is $\beta/4+(-1)^n\epsilon-\eta\pi/4$ with respect to the polarization of the input light;
the predetermined optic axis orientation of the first retarder is $3\beta/4-(-1)^n\epsilon+\eta\pi/4+\pi/2$ with respect to the polarization of the input light;
wherein $\eta$ is a non-negative integer, and $\epsilon$ is a small angle.

42. The rotator of claim 41, wherein the second optic axis orientation state of the second portion of the spatially switched retarder is $3\beta/4-(-1)^n\epsilon+\eta\pi/4$.

43. The rotator switch of claim 16 wherein $\beta=90°$.

44. The rotator switch of claim 16 wherein $\beta=45°$.

45. The rotator switch of claim 16 wherein said first retarder is a stretched polymer retarder.

46. The rotator switch of claim 45 wherein said first retarder is a polymer liquid crystal retarder.

47. An achromatic polarization rotator for receiving input light that is at least partially polarized with a predetermined polarization and selectively rotating the polarization of the input light by a predetermined angle, comprising:
an active retarder having a first optic axis orientation with respect to the polarization of the input light, and exhibiting a retardance at a design wavelength that is switchable between at least a first retardance value and a second retardance value; and
a spatially switched retarder, in series with the active retarder, having a second optic axis orientation, wherein the spatially switched comprises at least a first portion that exhibits the first retardation value at the design wavelength, and a second portion that exhibits the second retardation value at the design wavelength;
wherein, when the input light propagates through both the active retarder and the spatially switched retarder in series, the polarization of the input light is substantially unchanged when the active retarder exhibits the first retardation value and the input light propagates through the first portion of the spatially switched retarder, and is substantially achromatically rotated by the predetermined rotation angle $\beta$ when the active retarder exhibits the second retardation value and the input light propagates through the second portion of the spatially switched retarder.

48. The rotator of claim 47, wherein the input light is at least partially linearly polarized.

49. The rotator of claim 47, wherein the input light is at least partially elliptically polarized.

50. The rotator of claim 47, wherein the first retardation value is substantially zero, and the second retardation value is substantially half-wave at the design wavelength.

51. The rotator of claim 47, wherein the active retarder and the spatially switched retarder each exhibit a positive or a negative in-plane birefringence.

52. The rotator of claim 51, wherein the active retarder is positioned to receive the input light before the spatially switched retarder.

53. The rotator of claim 52, wherein:
the first optic axis orientation is $\beta/4+(-1)^n\epsilon-\eta\pi/4$ with respect to the polarization of the input light; and
the second optic axis orientation state is $3\beta/4-(-1)^n\epsilon+\eta\pi/4$ with respect to the polarization of the input light;
wherein $\eta$ is a non-negative integer, and $\epsilon$ is a small angle.

54. The rotator of claim 51, wherein the spatially switched retarder is positioned to receive the input light before the active retarder.

55. The rotator of claim 54, wherein:
the first optic axis orientation is $3\beta/4-(-1)^n\epsilon+\eta\pi/4$ with respect to the polarization of the input light; and
the second optic axis orientation state is $\beta/4+(-1)^n\epsilon-\eta\pi/4$ with respect to the polarization of the input light;
wherein $\eta$ is a non-negative integer, and $\epsilon$ is a small angle.

56. The rotator of claim 47, wherein one of the active and spatially switched retarders exhibits a negative in-plane birefringence and the other retarder exhibits a positive in-plane birefringence.

57. The rotator of claim 56, wherein the active retarder exhibits a positive in-plane birefringence and the second retarder exhibits a negative in-plane birefringence.

58. The rotator of claim 57, wherein the active retarder is positioned to receive the input light before the spatially switched retarder.

59. The rotator of claim 58, wherein:
the first optic axis orientation is $\beta/4+(-1)^n\epsilon-\eta\pi/4$ with respect to the polarization of the input light; and the second optic axis orientation state is $3\beta/4-(-1)^n\epsilon+\eta\pi/4+\pi/2$ with respect to the polarization of the input light;

wherein $\eta$ is a non-negative integer, and $\epsilon$ is a small angle.

60. The rotator of claim 57, wherein the spatially switched retarder is positioned to receive the input light before the active retarder.

61. The rotator of claim 60, wherein:

the first optic axis orientation is $3\beta/4-(-1)^n\epsilon+\eta\pi/4$ with respect to the polarization of the input light; and the second optic axis orientation is $\beta/4+(-1)^n\epsilon-\eta\pi/4+\pi/2$ with respect to the polarization of the input light;

wherein $\eta$ is a non-negative integer, and $\epsilon$ is a small angle.

62. The achromatic rotator of claim 6, wherein the predetermined retardance is a half-wave retardance at the design wavelength.

63. The achromatic rotator of claim 21, wherein the predetermined retardance is a half-wave retardance at the design wavelength.

* * * * *